(12) United States Patent
Saito et al.

(10) Patent No.: US 12,166,379 B2
(45) Date of Patent: Dec. 10, 2024

(54) CORE PIECE, STATOR CORE, STATOR, ROTARY ELECTRIC MACHINE, AND METHOD FOR PRODUCING CORE PIECE

(71) Applicants: Sumitomo Electric Industries, Ltd., Osaka (JP); SUMITOMO ELECTRIC SINTERED ALLOY, LTD., Takahashi (JP)

(72) Inventors: Tatsuya Saito, Osaka (JP); Tomoyuki Ueno, Osaka (JP); Tomoyuki Ishimine, Osaka (JP)

(73) Assignees: SUMITOMO ELECTRIC INDUSTRIES, LTD., Osaka (JP); SUMITOMO ELECTRIC SINTERED ALLOY, LTD., Takahashi (JP)

( * ) Notice: Subject to any disclaimer, the term of this patent is extended or adjusted under 35 U.S.C. 154(b) by 150 days.

(21) Appl. No.: 17/918,574

(22) PCT Filed: Mar. 31, 2021

(86) PCT No.: PCT/JP2021/014026
§ 371 (c)(1),
(2) Date: Oct. 13, 2022

(87) PCT Pub. No.: WO2021/225050
PCT Pub. Date: Nov. 11, 2021

(65) Prior Publication Data
US 2023/0143036 A1    May 11, 2023

(30) Foreign Application Priority Data

May 8, 2020 (JP) ................................ 2020-082831

(51) Int. Cl.
*H02K 1/14* (2006.01)
*H02K 1/02* (2006.01)
(Continued)

(52) U.S. Cl.
CPC ............... *H02K 1/148* (2013.01); *H02K 1/02* (2013.01); *H02K 15/022* (2013.01); *H02K 21/24* (2013.01)

(58) Field of Classification Search
CPC ............ H02K 1/148; H02K 1/12; H02K 1/02; H02K 1/146; H02K 1/27; H02K 1/06;
(Continued)

(56) References Cited

U.S. PATENT DOCUMENTS

| 2 A | * | 7/1836 | Goulding | ............... | D01G 21/00 |
| | | | | | 57/58.49 |
| 4,843,270 A | * | 6/1989 | Dijken | ................... | H02K 23/40 |
| | | | | | 318/400.42 |

(Continued)

FOREIGN PATENT DOCUMENTS

| JP | 2009-44829 A | 2/2009 |
| JP | 2011-30334 A | 2/2011 |

(Continued)

OTHER PUBLICATIONS

Notice of Allowance issued on Oct. 19, 2022, in corresponding U.S. Appl. No. 17/760,775, 25 pages.

*Primary Examiner* — Maged M Almawri
(74) *Attorney, Agent, or Firm* — XSENSUS LLP

(57) ABSTRACT

A core piece includes a first member in a column form and a second member in a plate form, the first member and the second member being configured by a green compact in which the first member and the second member are integrally formed, the green compact includes a plurality of soft magnetic particles having a flat shape, a first average aspect ratio of the soft magnetic particles is greater than or equal to 1.2 in a first cross section of the first member, a second average aspect ratio of the soft magnetic particles is greater than or equal to 1.2 in a second cross section of the second member, each of the first average aspect ratio and the second
(Continued)

average aspect ratio is related to an average of lengths of soft magnetic particles in a direction of the stator core.

10 Claims, 12 Drawing Sheets

(51) Int. Cl.
*H02K 15/02* (2006.01)
*H02K 21/24* (2006.01)

(58) Field of Classification Search
CPC ............ H02K 1/17; H02K 1/276; H02K 3/44; H02K 3/47; H02K 15/022; H02K 21/24
USPC .......... 310/43, 44, 45, 179, 208, 42, 154.11, 310/156.32, 156.53, 156.57, 216.067, 310/259, 258, 254
See application file for complete search history.

(56) References Cited

U.S. PATENT DOCUMENTS

| | | | | |
|---|---|---|---|---|
| 5,334,899 | A * | 8/1994 | Skybyk | H02K 9/227 310/268 |
| 6,069,431 | A * | 5/2000 | Satoh | H02K 1/02 310/43 |
| 6,555,942 | B1 * | 4/2003 | Hsu | H02K 3/522 310/194 |
| 6,809,453 | B2 * | 10/2004 | Narita | H02K 17/02 310/268 |
| 7,323,799 | B2 * | 1/2008 | Naito | H02K 1/148 310/216.077 |
| 7,528,521 | B2 * | 5/2009 | Naitou | H02K 1/2795 310/268 |
| 8,373,326 | B2 * | 2/2013 | Enomoto | H02K 1/148 310/216.046 |
| 9,470,238 | B2 * | 10/2016 | Vande Sande | H02K 3/00 |
| 9,762,095 | B2 * | 9/2017 | McPherson | H02K 15/02 |
| 10,177,631 | B1 * | 1/2019 | Hopkins | H02K 1/148 |
| 10,476,331 | B2 * | 11/2019 | Do | H02K 1/24 |
| 10,763,716 | B2 * | 9/2020 | Tokoi | H02K 3/524 |
| 10,848,016 | B2 * | 11/2020 | Shiohara | H02K 1/146 |
| 11,165,312 | B2 * | 11/2021 | Tokoi | H02K 1/20 |
| 11,205,935 | B2 * | 12/2021 | Enomoto | H02K 1/2795 |
| 11,296,572 | B1 * | 4/2022 | Kislev | H02K 15/066 |
| 11,309,762 | B2 * | 4/2022 | Hong | H02K 3/34 |
| 11,967,870 | B2 * | 4/2024 | Andrieux | H02K 1/12 |
| 2003/0057796 | A1 * | 3/2003 | Fan | H02K 1/02 310/216.062 |
| 2004/0212256 | A1 * | 10/2004 | Sugishima | H02K 3/487 29/598 |
| 2005/0073213 | A1 * | 4/2005 | Naito | H02K 1/148 310/156.32 |
| 2005/0242670 | A1 * | 11/2005 | Lee | H02K 3/522 310/43 |
| 2006/0043821 | A1 * | 3/2006 | Kojima | H02K 21/24 310/268 |
| 2010/0156204 | A1 * | 6/2010 | Endo | H02K 3/522 310/216.069 |
| 2010/0187934 | A1 * | 7/2010 | Asano | H02K 1/2795 310/156.32 |
| 2011/0024671 | A1 * | 2/2011 | Otsuki | B22F 1/08 252/62.55 |
| 2011/0095628 | A1 * | 4/2011 | Enomoto | H02K 1/148 310/44 |
| 2011/0221297 | A1 * | 9/2011 | Langford | H02K 15/024 310/215 |
| 2011/0309726 | A1 * | 12/2011 | Carpenter | H02K 21/24 310/75 R |
| 2012/0128512 | A1 * | 5/2012 | Vande Sande | F04D 13/06 29/596 |
| 2012/0235530 | A1 * | 9/2012 | Moya | H02K 21/24 310/156.01 |
| 2012/0262022 | A1 * | 10/2012 | Takemoto | H02K 1/2796 310/156.35 |
| 2013/0009508 | A1 * | 1/2013 | Takamatsu | H02K 1/2796 310/156.32 |
| 2013/0278103 | A1 * | 10/2013 | McPherson | H02K 15/02 310/154.02 |
| 2014/0015358 | A1 * | 1/2014 | Wan | H02K 3/522 310/198 |
| 2014/0070659 | A1 * | 3/2014 | Lee | H02K 1/02 310/216.104 |
| 2014/0103777 | A1 * | 4/2014 | Santos | H02K 15/022 310/254.1 |
| 2014/0117793 | A1 * | 5/2014 | Takahashi | H02K 9/00 310/180 |
| 2014/0265653 | A1 * | 9/2014 | Heins | H02K 1/143 310/198 |
| 2014/0368304 | A1 * | 12/2014 | Araki | H02K 1/02 252/62.55 |
| 2015/0303745 | A1 * | 10/2015 | Matsumoto | H02K 9/223 310/43 |
| 2015/0349588 | A1 * | 12/2015 | Tokoi | H02K 3/34 310/208 |
| 2016/0065020 | A1 * | 3/2016 | Tokoi | H02K 1/2795 310/156.08 |
| 2017/0025927 | A1 * | 1/2017 | Weerts | H02K 3/24 |
| 2017/0063172 | A1 * | 3/2017 | Shiohara | H02K 1/02 |
| 2017/0250580 | A1 * | 8/2017 | Rhyu | H02K 1/12 |
| 2018/0219442 | A1 * | 8/2018 | Heins | H02K 1/2796 |
| 2019/0214860 | A1 | 7/2019 | Igarashi et al. | |
| 2019/0288584 | A1 * | 9/2019 | Vansompel | H02K 9/227 |
| 2020/0067357 | A1 * | 2/2020 | Post | H02K 21/24 |
| 2021/0028663 | A1 * | 1/2021 | Hong | H02K 3/18 |
| 2021/0152040 | A1 * | 5/2021 | Yao | H02K 1/14 |
| 2021/0288569 | A1 * | 9/2021 | Yao | H02K 1/2798 |
| 2021/0328466 | A1 * | 10/2021 | Caamoño | H02K 1/185 |
| 2022/0271578 | A1 * | 8/2022 | Horiuchi | B33Y 80/00 |

FOREIGN PATENT DOCUMENTS

| | | |
|---|---|---|
| JP | 2011-66977 A | 3/2011 |
| JP | 2017-229191 A | 12/2017 |

* cited by examiner

CORE PIECE, STATOR CORE, STATOR, ROTARY ELECTRIC MACHINE, AND METHOD FOR PRODUCING CORE PIECE

CROSS-REFERENCE TO RELATED APPLICATIONS

The present application is based on PCT/JP2021/014026 filed on Mar. 31, 2021, which claims priority to Japanese Application No. 2020-082831, filed on May 8, 2020, the entire contents of each are incorporated herein by reference.

TECHNICAL FIELD

The present disclosure relates to a core piece, a stator core, a stator, a rotary electric machine, and a method for producing a core piece.

BACKGROUND ART

PTL 1 discloses a stator core for an axial gap type motor. The stator core includes a yoke part, and teeth.

CITATION LIST

Patent Literature

PTL 1: Japanese Patent Laying-Open No. 2009-44829

SUMMARY OF INVENTION

A core piece according to the present disclosure is a core piece that is circularly arranged to construct a stator core of an axial gap type rotary electric machine, the core piece including a first member in a column form extending in an axial direction of the stator core, and a second member in a plate form disposed on a first end side of the first member in the axial direction of the stator core. The first member and the second member are configured by a green compact in which the first member and the second member are integrally molded, the green compact includes a plurality of soft magnetic particles, the soft magnetic particles have a flat shape, a first average aspect ratio of the soft magnetic particles is greater than or equal to 1.2 in a first cross section of the first member in the axial direction and a radial direction of the stator core, a second average aspect ratio of the soft magnetic particles is greater than or equal to 1.2 in a second cross section of the second member orthogonal to the axial direction of the stator core, the first average aspect ratio is a ratio L12/L11 between an average length L11 and an average length L12 in the first cross section, the second average aspect ratio is a ratio L22/L21 between an average length L21 and an average length L22 in the second cross section, the average length L11 is an average of lengths of the soft magnetic particles in the radial direction of the stator core, the average length L12 is an average of lengths of the soft magnetic particles in the axial direction of the stator core, the average length L21 is an average of lengths of the soft magnetic particles in the radial direction of the stator core, and the average length L22 is an average of lengths of the soft magnetic particles in a circumferential direction of the stator core.

A stator core according to the present disclosure is a stator core of an axial gap type rotary electric machine, and has a plurality of core pieces that are circularly arranged, and each of the plurality of core pieces is the core piece according to the present disclosure.

A stator according to the present disclosure is a stator of an axial gap type rotary electric machine, and includes the stator core according to the present disclosure, and a coil arranged on each of the first members in the stator core.

An axial gap type rotary electric machine according to the present disclosure includes a rotor, and a stator, and the stator is the stator according to the present disclosure.

A method for producing a core piece according to the present disclosure is a method for producing a core piece that is circularly arranged to construct a stator core of an axial gap type rotary electric machine, the method including filling a mold with raw material powder containing a plurality of soft magnetic particles having a spherical shape, and compressing the raw material powder in the mold into a compact. The core piece includes a first member in a column form extending in an axial direction of the stator core, and a second member in a plate form disposed on a first end side of the first member in the axial direction of the stator core, and a direction in which the raw material powder is compressed is a direction along a radial direction of the stator core.

DETAILED DESCRIPTION

Figure 1:
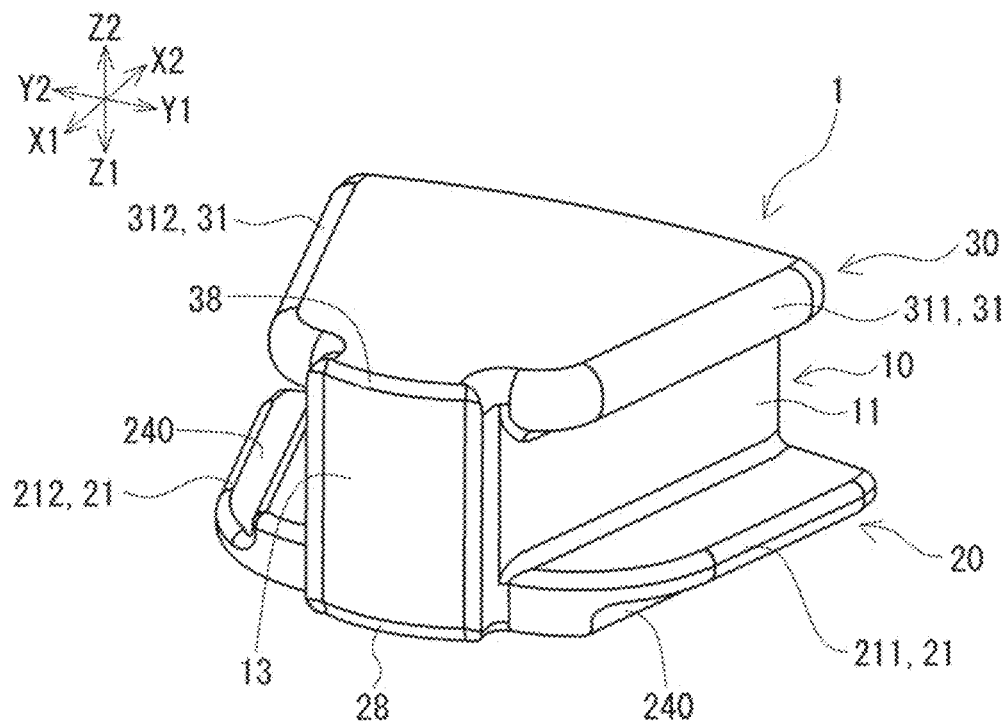
FIG. 1 is a perspective view showing an outline of a core piece according to a first embodiment.

Problem to be Solved by the Present Disclosure

Improvement in magnetic characteristics of an axial gap type rotary electric machine has been desired.

One object of the present disclosure is to provide a core piece, a stator core, and a stator that can construct an axial gap type rotary electric machine excellent in magnetic characteristics. Another object of the present disclosure is to provide a rotary electric machine excellent in magnetic characteristics. Another object of the present disclosure is to provide a method for producing a core piece by which the above-described core piece can be produced.

Advantageous Effect of the Present Disclosure

The core piece, the stator core, and the stator according to the present disclosure can construct an axial gap type rotary electric machine excellent in magnetic characteristics. The rotary electric machine according to the present disclosure is excellent in magnetic characteristics. The method for producing a core piece according to the present disclosure can produce a core piece that can construct an axial gap type rotary electric machine excellent in magnetic characteristics.

Description of Embodiments

Frist, description is made by listing aspects of the present disclosure.

(1) A core piece according to one aspect of the present disclosure is a core piece that is circularly arranged to construct a stator core of an axial gap type rotary electric machine, the core piece including a first member in a column form extending in an axial direction of the stator core, and a second member in a plate form disposed on a first end side of the first member in the axial direction of the stator core. The first member and the second member are configured by a green compact in which the first member and the second member are integrally molded, the green compact includes a plurality of soft magnetic particles, the soft magnetic particles have a flat shape, a first average aspect ratio of the soft magnetic particles is greater than or equal to 1.2 in a first cross section of the first member in the axial direction and a radial direction of the stator core, a second average aspect ratio of the soft magnetic particles is greater than or equal to 1.2 in a second cross section of the second member orthogonal to the axial direction of the stator core, the first average aspect ratio is a ratio L12/L11 between an average length L11 and an average length L12 in the first cross section, the second average aspect ratio is a ratio L22/L21 between an average length 121 and an average length L22 in the second cross section, the average length L11 is an average of lengths of the soft magnetic particles in the radial direction of the stator core, the average length L12 is an average of lengths of the soft magnetic particles in the axial direction of the stator core, the average length L21 is an average of lengths of the soft magnetic particles in the radial direction of the stator core, and the average length L22 is an average of lengths of the soft magnetic particles in a circumferential direction of the stator core.

The core piece can construct an axial gap type rotary electric machine excellent in magnetic characteristics. This is because, in both the first member and the second member, the soft magnetic particles are oriented in a direction in which the magnetic flux passes, and the number of grain boundaries that become a magnetic gap is small. The detailed reason is as follows.

When an axial gap type rotary electric machine is constructed using the core piece, the magnetic flux passes through the core piece. The magnetic flux passes through the second member and the first member in this order. Alternatively, the magnetic flux passes through the first member and the second member in this order. Even when the magnetic flux passes in any order, the magnetic flux passing through the first member travels in a direction in which the first member extends, that is, the axial direction of the stator core. The magnetic flux passing through the second member travels in a direction along the surface of the second member, that is, the circumferential direction of the stator core. As described above, in the core piece, the magnetic flux passing through the first member and the magnetic flux passing through the second member travel in different directions.

The first member of the core piece has the first average aspect ratio greater than or equal to 1.2 in the first cross section. That is, in the first cross section of the first member, the length of the soft magnetic particles in the axial direction of the stator core is longer than the length of the soft magnetic particles in the radial direction of the stator core. In other words, the length of the soft magnetic particles in the direction of the magnetic flux is longer than the length in the direction orthogonal to the direction of the magnetic flux.

The second member of the core piece has the second average aspect ratio greater than or equal to 1.2 in the second cross section. That is, in the second cross section of the second member, the length of the soft magnetic particles in the circumferential direction of the stator core is longer than the length of the soft magnetic particles in the radial direction of the stator core. In other words, the length of the soft magnetic particles in the direction of the magnetic flux is longer than the length in the direction orthogonal to the direction of the magnetic flux.

In the first cross section of the first member, a first field of view having a square shape is taken. The first field of view has a pair of first sides extending in the axial direction of the stator core and a pair of second sides extending in the radial direction of the stator core. In the second cross section of the second member, a second field of view having a square shape is taken. The second field of view has a pair of first sides extending in the radial direction of the stator core and a pair of second sides extending in the direction orthogonal to the radial direction of the stator core.

When the first average aspect ratio of the soft magnetic particles is greater than or equal to 1.2, the number of soft magnetic particles arranged in parallel in the axial direction of the stator core is smaller than the number of soft magnetic particles arranged in parallel in the radial direction of the stator core in the first field of view. In other words, in the first field of view, the number of soft magnetic particles arranged in parallel in the direction of the magnetic flux is smaller than the number of soft magnetic particles arranged in parallel in the direction orthogonal to the direction of the magnetic flux. That is, in the first field of view, the number of grain boundaries dividing the axial direction of the stator core is small. In other words, in the first field of view, the number of grain boundaries dividing the direction of the magnetic flux is small. The grain boundary refers to a space between adjacent soft magnetic particles.

When the second average aspect ratio of the soft magnetic particles is greater than or equal to 1.2, the number of soft magnetic particles arranged in parallel in the circumferential direction of the stator core is smaller than the number of soft magnetic particles arranged in parallel in the radial direction of the stator core in the second field of view. In other words, in the second field of view, the number of soft magnetic particles arranged in parallel in the direction of the magnetic flux is smaller than the number of soft magnetic particles arranged in parallel in the direction orthogonal to the direction of the magnetic flux. That is, in the second field of view, the number of grain boundaries dividing the circumferential direction of the stator core is small. In other words, in the second field of view, the number of grain boundaries dividing the direction of the magnetic flux is small.

The core piece is configured by a green compact in which the first member and the second member are integrally molded. As will be described in detail later, such a core piece can be produced with a direction in which pressure is applied to the raw material powder in the mold and a direction in which the produced core piece is removed from the mold set to a direction along the radial direction of the stator core in the core piece.

Conventionally, the core piece configured by the green compact in which the first member and the second member are integrally molded is produced with the pressing direction and the removing direction set to a direction along the axial direction of the stator core in the core piece. As described above, the core piece and the conventional core piece are different from each other in the pressing direction and the removing direction when the core piece is produced.

A green compact of a conventional core piece is produced by pressure molding raw material powder filled in the mold hole of the die of the mold by means of the upper punch and the lower punch. The pressing direction is the direction along the axial direction of the stator core in the core piece, namely, the direction parallel with the first member and the second member. Of the green compact, the surface on the first end side and the surface on the second end side of the axial direction of the stator core are formed by the upper end face of the lower punch and the lower end face of the upper punch. Of the green compact, the surface on a first direction side and the surface on a second direction side of a circumferential direction of the stator core are formed by the inner peripheral surface of the lower punch. Of the green compact, the surface on an outer peripheral side and the surface on an inner peripheral side of the stator core are formed by the inner peripheral surface of the mold hole of the die. That is, the first end surface of the axial direction of the first member, and the first end surface of the axial direction of the second member are formed by the upper end face of the lower punch. The second end surface of the axial direction of the second member is formed by the lower end face of the upper punch. The surface on the first direction side and the surface on the second direction side of the circumferential direction of the first member are formed by the inner peripheral surface of the lower punch. The surface on the outer peripheral side and the surface on the inner peripheral side of the first member and the second member are formed by the inner peripheral surface of the mold hole of the die. The direction of removing the green compact from the mold is the same direction as the pressing direction, and is the direction along the axial direction of the stator core in the core piece, namely, the direction parallel with the first member and the second member.

As with the second member of the core piece, the magnetic flux passing through the first member of the conventional core piece travels in the axial direction of the stator core. As with the second member of the core piece, the magnetic flux passing through the second member of the conventional core piece travels in the circumferential direction of the stator core.

The first member of the conventional core piece has a first cross section similar to the first cross section of the first member of the core piece. In the first cross section of the conventional core piece, a first field of view having a square shape similar to the first field of view described above is taken. The second member of the conventional core piece has a second cross section similar to the second cross section of the second member of the core piece. In the second cross section of the conventional core piece, a second field of view having a square shape similar to the second field of view described above is taken.

Unlike the first cross section of the first member of the core piece, in the first cross section of the first member of the conventional core piece, the length of the soft magnetic particles in the axial direction of the stator core is shorter than the length in the radial direction of the stator core. Therefore, unlike the first field of view of the core piece, in the first field of view of the conventional core piece, the number of soft magnetic particles arranged in parallel in the axial direction of the stator core is larger than the number of soft magnetic particles arranged in parallel in the radial direction of the stator core. In other words, unlike the first field of view of the core piece, in the first field of view of the conventional core piece, the number of soft magnetic particles arranged in parallel in the direction of the magnetic flux is larger than the number of soft magnetic particles arranged in parallel in the direction orthogonal to the direction of the magnetic flux. That is, unlike the first field of view of the core piece, in the first field of view of the conventional core piece, the number of grain boundaries dividing the axial direction of the stator core is large. In other words, unlike the first field of view of the core piece, in the first field of view of the conventional core piece, the number of grain boundaries dividing the direction of the magnetic flux is large.

Unlike the second cross section of the second member of the core piece, in the second cross section of the second member of the conventional core piece, the length of soft magnetic particles in the circumferential direction of the stator core is approximately the same as the length of soft magnetic particles in the radial direction of the stator core. Therefore, unlike the second field of view of the core piece, in the second field of view of the conventional core piece, the number of soft magnetic particles arranged in parallel in the circumferential direction of the stator core is approximately the same as the number of soft magnetic particles arranged in parallel in the radial direction of the stator core. In other words, unlike the second field of view of the core piece, in the second field of view of the conventional core piece, the number of grain boundaries dividing the circumferential direction of the stator core is approximately the same as the number of grain boundaries dividing the radial direction of the stator core. That is, unlike the second field of view of the core piece, in the second field of view of the conventional core piece, the number of soft magnetic particles arranged in parallel in the direction of the magnetic flux is approximately the same as the number of soft magnetic particles arranged in parallel in the direction orthogonal to the direction of the magnetic flux. Unlike the second field of view of the core piece, in the second field of view of the conventional core piece, the number of grain boundaries dividing the direction of the magnetic flux is approximately the same as the number of grain boundaries dividing the direction orthogonal to the direction of the magnetic flux.

As described above, the first member of the core piece is smaller in number of grain boundaries dividing the direction of the magnetic flux than the first member of the conventional core piece. This grain boundary becomes a magnetic gap. The larger the magnetic gap, the greater the magnetoresistance. This allows the first member of the core piece to easily transmit the magnetic flux as compared with the first member of the conventional core piece. The second member of the core piece is approximately the same in ease of transmitting the magnetic flux as the second member of the conventional core piece. This allows the core piece to easily transmit the magnetic flux as compared with the conventional core piece.

(2) In one form of the core piece, the green compact has a relative density of greater than or equal to 85%.

The core piece can construct an axial gap type rotary electric machine that is excellent in magnetic characteristics such as saturation magnetic flux density since the core piece is high in density. In addition, the core piece is excellent in mechanical characteristics such as strength.

(3) In one form of the core piece, the soft magnetic particles are composed of pure iron or an iron-based alloy, and the iron-based alloy is an Fe—Si alloy, an Fe—Al alloy, or an Fe—Si—Al alloy.

The core piece has high density, and is excellent in accuracy of dimension. This is because soft magnetic particles are easy to deform at the time of molding the green compact since the above materials are relatively soft.

(4) In one form of the core piece, the soft magnetic particles may have an average particle size greater than or equal to 30 μm.

When the average particle size of the soft magnetic particles is greater than or equal to 30 μm, a relative permeability tends to increase. The core piece including the soft magnetic particles is low in loss. This allows the core piece to easily construct a low-loss axial gap type rotary electric machine.

(5) In one form of the core piece, a proportion of a second height to a first height of the core piece is greater than or equal to 80%, the first height is a length of the core piece in the axial direction of the stator core, and the second height is a length, in the axial direction of the stator core, of a region excluding the second member from the core piece.

In the core piece, the proportion of the length of the region excluding the second member from the core piece to the length of the core piece is large. Therefore, when the core piece and the conventional core piece are uniform in the length of the core piece, the core piece can easily construct an axial gap type rotary electric machine excellent in magnetic characteristics as compared with the conventional core piece.

(6) In one form of the core piece, the second member includes an outer peripheral surface located on an outer peripheral side of the stator core, an inner peripheral surface located on an inner peripheral side of the stator core, and a first end surface located on a first end side of the stator core in the axial direction, a corner part between the outer peripheral surface and the first end surface and a corner part between the inner peripheral surface and the first end surface are chamfered, and a chamfering length of each of the corner parts is greater than or equal to 0.1 mm and less than or equal to 0.5 mm.

When the chamfering length falls within the above-described range, each corner part is difficult to be damaged.

(7) In one form of the core piece, the core piece includes a third member in a plate form disposed on the second end side of the first member in the axial direction, the first member has a peripheral surface connecting with the second member and the third member, the second member has a protruding portion projecting outwardly from the peripheral surface of the first member, the third member has a protruding portion projecting outwardly from the peripheral surface of the first member, and the first member, the second member, and the third member are configured by a green compact in which the first member, the second member, and the third member are integrally molded.

The core piece is excellent in productivity. The reason is as follows.

Conventionally, a core piece including the first member, the second member, and the third member is configured by combining, for example, a green compact in which the first member and the second member are integrally molded and the third member configured separately from the green compact. Alternatively, the conventional core piece is configured by combining a green compact in which the first member and the third member are integrally molded, and the second member configured separately from the green compact. That is, a conventional core piece needs to be configured by manufacturing at least two members and combining the members. Therefore, a large number of steps and a long production time are required to produce a conventional core piece. Also, at least two molds are required to produce a conventional core piece.

In contrast, the core piece need not combine a plurality of members since the core piece is configured by the green compact in which the first member, the second member, and the third member are integrally molded. Therefore, the core piece can be produced with less steps and in a shorter time as compared with the conventional core piece. Also, the core piece can be produced with one mold since the core piece is configured by the green compact in which the first member, the second member, and the third member are integrally molded. Therefore, it is possible to reduce the cost required for production and maintenance of the mold, and it is possible to produce the core piece at a low cost.

The core piece cannot be produced by the conventional production method along the same direction as the pressing direction and the removing direction of the core piece. This is because each of the second member and the third member has a protruding portion, the protruding portions are caught by the inner peripheral surface of the mold hole of the die, and the core piece cannot come out of the mold.

Although the details are described later, the core piece can be produced by setting the pressing direction and the removing direction along the radial direction of the stator core. Of the core piece, the surface on the outer peripheral side and the surface on the inner peripheral side of the stator core are formed by the lower end face of the upper punch and the upper end face of the lower punch. Of the core piece, the surface on the first direction side and the surface on the second direction side in the circumferential direction of the stator core, and the surface on the first end side and the surface on the second end side in the axial direction of the stator core are formed by the inner peripheral surface of the mold hole of the die. In this case, even though each of the second member and the third member has a protruding portion, the protruding portions are not caught by the inner peripheral surface of the mold hole of the die, so that the core piece can be removed from the mold.

(8) In one form of the core piece of the above (7), each of the first member, the second member, and the third member has: an outer peripheral surface located on an outer peripheral side of the stator core; an inner peripheral surface located on an inner peripheral side of the stator core; a first lateral surface located on a first direction side of the circumferential direction of the stator core, and connecting with the outer peripheral surface and the inner peripheral surface; and a second lateral surface located on a second direction side of the circumferential direction of the stator core, and connecting with the outer peripheral surface and the inner peripheral surface, and in each of the first member, the second member, and the third member, a length between the first lateral surface and the second lateral surface in the outer peripheral surface is longer than a length between the first lateral surface and the second lateral surface in the inner peripheral surface, and each of the first lateral surface and the second lateral surface in each of the first member, the second member, and the third member has: a first parallel face connecting with the outer peripheral surface; a second parallel face connecting with the inner peripheral surface; and a first inclined face connecting with the first parallel face and the second parallel face, and in each of the first member, the second member, and the third member, the first parallel face of the first lateral surface and the first parallel face of the second lateral surface are parallel with each other; the second parallel face of the first lateral surface and the second parallel face of the second lateral surface are parallel with each other, and the first parallel face of the first lateral surface and the second parallel face of the first lateral surface are parallel with each other.

The core piece has high relative density. The reason is as follows. The first parallel face and the second parallel face can be formed by a straight part along the pressing direction of the upper punch and the lower punch in the mold hole of the die of the mold as will be specifically described later. Therefore, pressure can be sufficiently applied to the raw material powder that forms the core piece.

The core piece is excellent in productivity. The reason is as follows. The first inclined face can be formed by a taper part crossing the pressing direction of the upper punch and the lower punch in the mold hole of the die of the mold as will be specifically described later. Since the mold hole of the die has the straight part, the upper punch and the lower punch are prevented from coming into contact with the inner peripheral surface of the taper part. Therefore, the service life of the mold is extended, and the number of core pieces that can be produced with one mold increases.

(9) In one form of the core piece of the above (8), in each of the first member, the second member, and the third member, an angle formed by an extended plane of the first parallel face and the first inclined face in the first lateral surface is greater than or equal to 5° and less than or equal to 20°, and an angle formed by an extended plane of the first parallel face and the first inclined face in the second lateral surface is greater than or equal to 5° and less than or equal to 20°.

The core piece facilitates winding of wire on the peripheral surface of the first member, and is easy to construct a stator since the angle formed in the first member satisfies the above range. The core piece is easy to arrange circularly, and easy to construct a stator core since the angle formed in the second member satisfies the above range. The core piece can suppress variation in density in the core piece since the angle formed in the third member satisfies the above range.

(10) In one form of the core piece of the above (8) or the above (9), each of the protruding portion of the second member and the protruding portion of the third member has: a first protruding part projecting on the first direction side of the circumferential direction; and a second protruding part projecting on the second direction side of the circumferential direction, a protruding amount of the first protruding part in the second member is larger than a protruding amount of the first protruding part in the third member, a protruding amount of the second protruding part in the second member is larger than a protruding amount of the second protruding part in the third member, the first inclined face of the first protruding part in the second member has a projecting part projecting outwardly from a first imaginary plane, the first inclined face of the second protruding part in the second member has a projecting part projecting outwardly from a second imaginary plane, the first imaginary plane is a plane connecting a connection part between the first parallel face and the first inclined face, and a connection part between the second parallel face and the inner peripheral surface in the first lateral surface of the first protruding part in the second member, and the second imaginary plane is a plane connecting a connection part between the first parallel face and the first inclined face, and a connection part between the second parallel face and the inner peripheral surface in the second lateral surface of the second protruding part in the second member.

The core piece is easy to construct a stator core having a large magnetic path area. The reason is as follows.

The stator core is configured by circularly arranging plural core pieces. As the stator core, the one configured by combining a first core piece and a second core piece adjoining in the circumferential direction such that they are in contact with each other is known.

For example, the core piece in which each of the first lateral surface of the first protruding part and the second lateral surface of the second protruding part has a first parallel face, a second parallel face, and a first inclined face, and the first inclined face does not have the projecting part is as follows. In circularly arranging the core pieces, if one attempts to bring the first lateral surface of the first protruding part in the second member of the first core piece, and the second lateral surface of the second protruding part in the second member of the second core piece into contact with each other, a first corner part of the first core piece and a second core part of the second core piece come into contact with each other. The first corner part is a corner part between the first lateral surface of the first protruding part and the inner peripheral surface in the second member. The second corner part is a corner part between the second lateral surface of the second protruding part and the inner peripheral surface in the second member. Therefore, it is impossible to sufficiently bring the first lateral surface of the first protruding part in the second member of the first core piece, and the second lateral surface of the second protruding part in the second member of the second core piece into contact with each other.

In contrast, in the core piece, each of the first lateral surface of the first protruding part and the second lateral surface of the second protruding part has a first parallel face, a second parallel face, and a first inclined face, and the first inclined face has a part projecting outwardly from each of the first imaginary plane and the second imaginary plane. In circularly arranging the core piece, even if the first lateral surface of the first protruding part in the second member of the first core piece, and the second lateral surface of the second protruding part in the second member of the second core piece are brought into contact with each other, it is possible to prevent the first corner part of the first core piece and the second core part of the second core piece from coming into contact with each other. Therefore, it is possible to sufficiently bring the first lateral surface of the first protruding part in the second member of the first core piece, and the second lateral surface of the second protruding part in the second member of the second core piece into contact with each other.

(11) In one form of the core piece of the above (10), the first lateral surface of the first protruding part in the second member has one selected from the group consisting of at least one of a recess or a protrusion, a step, and a second inclined face, and the second lateral surface of the second protruding part in the second member has one selected from the group consisting of at least one of a protrusion corresponding to the recess of the first lateral surface or a recess corresponding to the protrusion of the first lateral surface, a step corresponding to the step of the first lateral surface, and a second inclined face corresponding to the second inclined face of the first lateral surface.

The core piece is easy to construct a stator core having a large magnetic path area. The reason is as follows. The first core piece and the second core piece adjoining in the circumferential direction of the stator core can be fitted with each other by means of the steps or by means of the recess and the protrusion, or can be brought into contact with each other by means of the second inclined faces. Therefore, it is possible to sufficiently bring the first core piece and the second core piece into contact with each other, and thus it is possible to increase the contact area between the first core piece and the second core piece.

(12) In one form of the core piece of the above (10) or the above (11), the third member has a first end surface located on an opposite side of the side facing with the second member, and the first end surface is formed to have a convex shape toward the opposite side.

Such a core piece can construct an axial gap type rotary electric machine generating little noises and vibrations. The reason is as follows. In such an axial gap type rotary electric machine, a stator and a rotor are arranged to face with each other. A stator is configured by arranging a coil on each first member of a stator core. The stator core is configured by circularly arranging plural core pieces. Since the first end surface of the core piece is formed to have a convex shape, abrupt change in the magnetic flux of the magnet of the rotor received by the core piece is easily suppressed. Since abrupt change in the magnetic flux is easily suppressed, cogging torque is easily reduced. Since the cogging torque is small, noises and vibrations are difficult to increase.

(13) In one form of any one of the core pieces of the above (8) to the above (12), the outer peripheral surface of each of the first member, the second member, and the third member has a curved surface that is convex toward the outer peripheral side, and the inner peripheral surface of each of the first member, the second member, and the third member has a curved surface that is convex toward the inner peripheral side.

The core piece can suppress variation in density in the core piece.

(14) In one form of any one of the core pieces of the above (8) to the above (13), a first joint between the protruding portion of the second member and the peripheral surface of the first member, and a second joint between the protruding portion of the third member and the peripheral surface of the first member are rounded.

The core piece is difficult to be damaged starting from the joints since the first joint and the second joint are rounded.

(15) In one form of the core piece of the above (14), the first joint and the second joint have bend radii of greater than or equal to 0.2 mm and less than or equal to 4.0 mm.

The core piece can reduce the load on the mold at the time of producing the core piece since the bend radii of the first joint and the second joint are greater than or equal to 0.2 mm. The core piece facilitates winding of the coil at the time of constructing the stator, and facilitates increase in the number of windings of the coil since the bend radii of the first joint and the second joint are less than or equal to 4.0 mm.

(16) In one form of any one of the core pieces of the above (8) to the above (15), each of the second member and the third member has a first end surface located on an opposite side of the side where the members face with each other, and in each of the second member and the third member, a corner part between the outer peripheral surface and the first end surface, and a corner part between the inner peripheral surface and the first end surface are chamfered.

The core piece is difficult to be damaged in the corner parts since the corner parts are chamfered.

(17) In one form of any one of the core pieces of the above (8) to the above (16), a total area of the outer peripheral surface in each of the first member, the second member, and the third member is greater than 1 time and less than or equal to 4 times a total area of the inner peripheral surface in each of the first member, the second member, and the third member.

The core piece is easy to arrange circularly and easy to construct a stator core since the total area of the outer peripheral surface is more than 1 time the total area of the inner peripheral surface. The core piece is easy to produce since the total area of the outer peripheral surface is less than or equal to 4 times the total area of the inner peripheral surface. Since the proportion of the total area of the inner peripheral surface is relatively large, the area pushing out the core piece by the lower punch is large at the time of removing the core piece from the mold. Therefore, it is easy to prevent a damage of the core piece at the time of removing the core piece from the mold.

(18) In one form of any one of the core pieces of the above (8) to the above (17), among sites obtained by dividing the core piece into three parts with an imaginary plane along the second parallel face of the first lateral surface, and with an imaginary plane along the second parallel face of the second lateral surface, difference in relative density between a first site on the first direction side of the circumferential direction and a second site on the second direction side of the circumferential direction, and a third site between the first site and the second site is less than or equal to 5.0%.

The core piece has substantially uniform physical characteristics such as magnetic characteristics inside the core piece since difference in relative density is small.

(19) In one form of the core pieces of the above (7) to the above (18), among the first member, the second member, and the third member, difference in relative density between a member having the largest relative density and a member having the smallest relative density is less than or equal to 5%.

The core piece has substantially uniform physical characteristics such as magnetic characteristics inside the core piece since difference in relative density is small.

(20) A stator core according to one aspect of the present disclosure is a stator core of an axial gap type rotary electric machine, and has a plurality of core pieces that are circularly arranged, and each of the plurality of core pieces is any one of the core pieces of the above (1) to the above (19).

Since the stator core includes the core piece, it is possible to construct an axial gap type rotary electric machine excellent in magnetic characteristics.

(21) In one form of the stator core, variation in length between a surface on the first end side and a surface on the second end side in the axial direction in each of the plurality of core pieces is less than or equal to 0.1 mm.

In the stator core, the variation in length is very small. Therefore, the stator core can construct an axial gap type rotary electric machine generating little noises and vibrations. The reason is as follows. In such an axial gap type rotary electric machine, a stator and a rotor are arranged to face with each other as described above. The stator is configured by arranging a coil on the first member of each core piece of the stator core. Since the variation in length in the stator core is small, the variation in the interval between the stator and the rotor is small. Since the variation in the interval is small, the torque ripple is small. Since the torque ripple is small, noises and vibrations are difficult to increase.

(22) A stator according to one aspect of the present disclosure is a stator of an axial gap type rotary electric machine, and includes the stator core according to the above (20) or the above (21), and a coil arranged on each of the first members in the stator core.

Since the stator includes the stator core, it is possible to construct an axial gap type rotary electric machine excellent in magnetic characteristics.

(23) A rotary electric machine according to one aspect of the present disclosure is an axial gap type rotary electric machine including a rotor and a stator, and the stator is the stator of the above (22).

Since the rotary electric machine includes the stator, the rotary electric machine is excellent in magnetic characteristics.

(24) In one form of the rotary electric machine, a proportion of first magnetoresistance of the core piece to magnetoresistance of the rotary electric machine is greater than or equal to 2%, and the first magnetoresistance is magnetoresistance of a region excluding the second member from the core piece.

As described above, the first member of the core piece is smaller in magnetoresistance than the first member of the conventional core piece. Therefore, as the proportion of the first magnetoresistance is higher, the rotary electric machine including the core piece is more excellent in magnetic characteristics than the rotary electric machine including the conventional core piece. The magnetoresistance of the axial gap type rotary electric machine will be described later.

(25) A method for producing a core piece according to one aspect of the present disclosure is a method for producing a core piece that is circularly arranged to construct a stator core of an axial gap type rotary electric machine, the method including filling a mold with raw material powder containing a plurality of soft magnetic particles having a spherical shape, and compressing the raw material powder in the mold into a compact. The core piece includes a first member in a column form extending in an axial direction of the stator core, and a second member in a plate form disposed on a first end side of the first member in the axial direction of the stator core, and a direction in which the raw material powder is compressed is a direction along a radial direction of the stator core.

The method for producing a core piece can produce the core piece according to one aspect of the present disclosure using the soft magnetic particles having a spherical shape and setting the direction in which the raw material powder is compressed is a direction along the radial direction of the stator core. Therefore, the method for producing a core piece can produce a core piece that can construct an axial gap type rotary electric machine excellent in magnetic characteristics.

Details of Embodiment of the Present Disclosure

The details of embodiments of the present disclosure are described below by referring to drawings. In drawings, the same sign indicates the object having the same name.

First Embodiment

With reference to FIG. 1 to FIG. 11, a core piece 1 according to a first embodiment is described. As will be described later by referring to FIG. 16, core pieces 1 of the present embodiment are circularly arranged to construct a stator core 7. Although the details are described later, stator core 7 is used in an axial gap type rotary electric machine 9 as will be described later by referring to FIGS. 18 and 19. As shown in FIG. 1, core piece 1 of the present embodiment includes a first member 10 in a column form, and a second member 20 in a plate form. First member 10 extends in the axial direction of stator core 7. Second member 20 is disposed on a first end side of the axial direction in first member 10. One of the features of core piece 1 of the present embodiment is that all of the following configurations (a) to (c) are satisfied.

(a) Core piece 1 is configured by a green compact in which first member 10 and second member 20 are compressed in a specific direction to be integrally molded.

Figure 7:
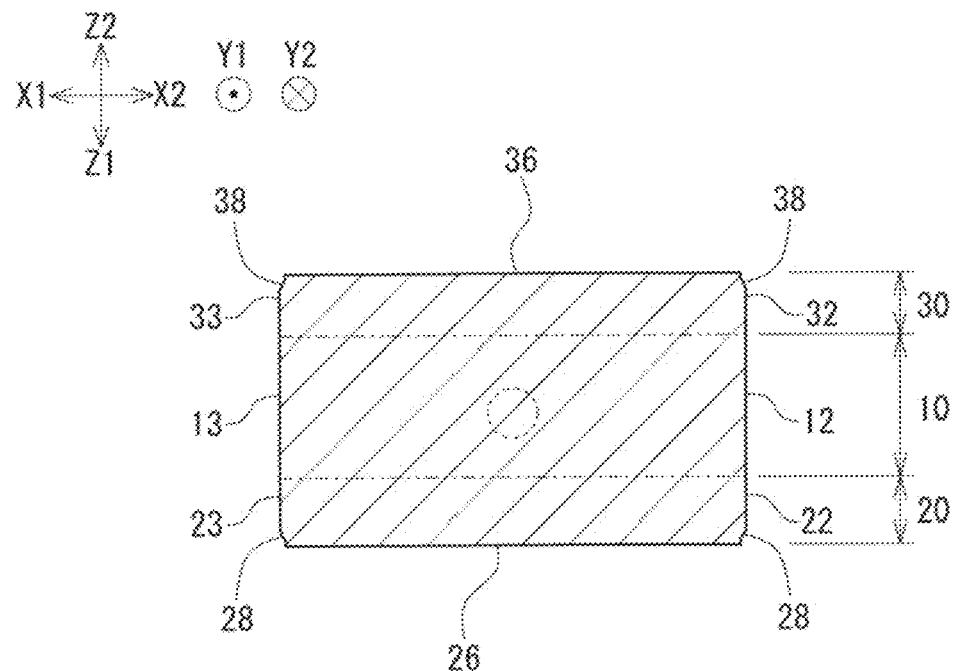
FIG. 7 is a VII-VII sectional view of the core piece shown in FIG. 2.
Figure 8:
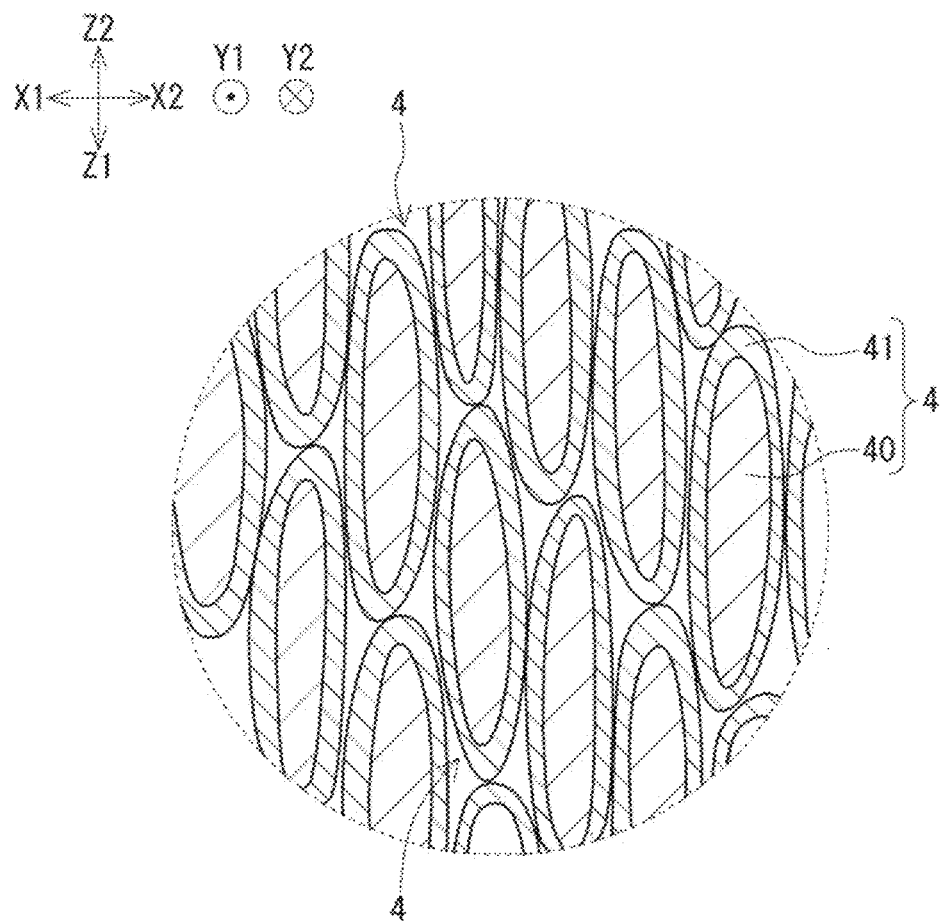
FIG. 8 is an enlarged view showing an outline of a portion enclosed by a dashed line in FIG. 7.

(b) In a first cross section of first member 10 shown in FIG. 7, a first average aspect ratio of soft magnetic particles 40 shown in FIG. 8 falls within a specific range.

Figure 5:
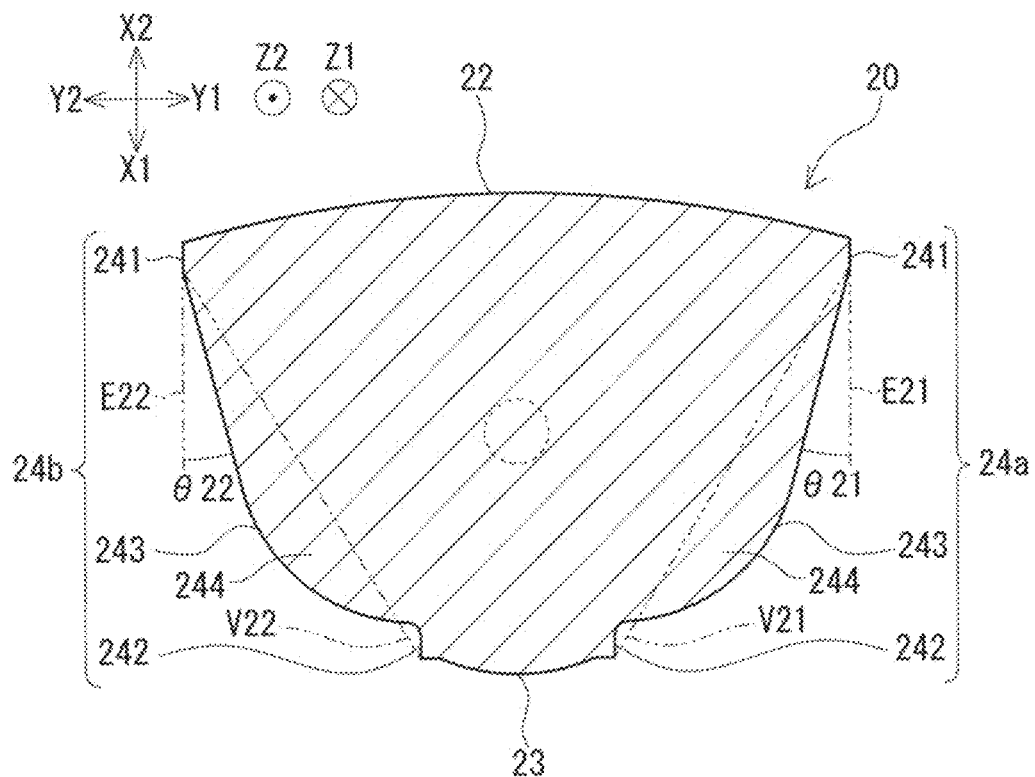
FIG. 5 is a V-V sectional view of the core piece shown in FIG. 3.
Figure 9:
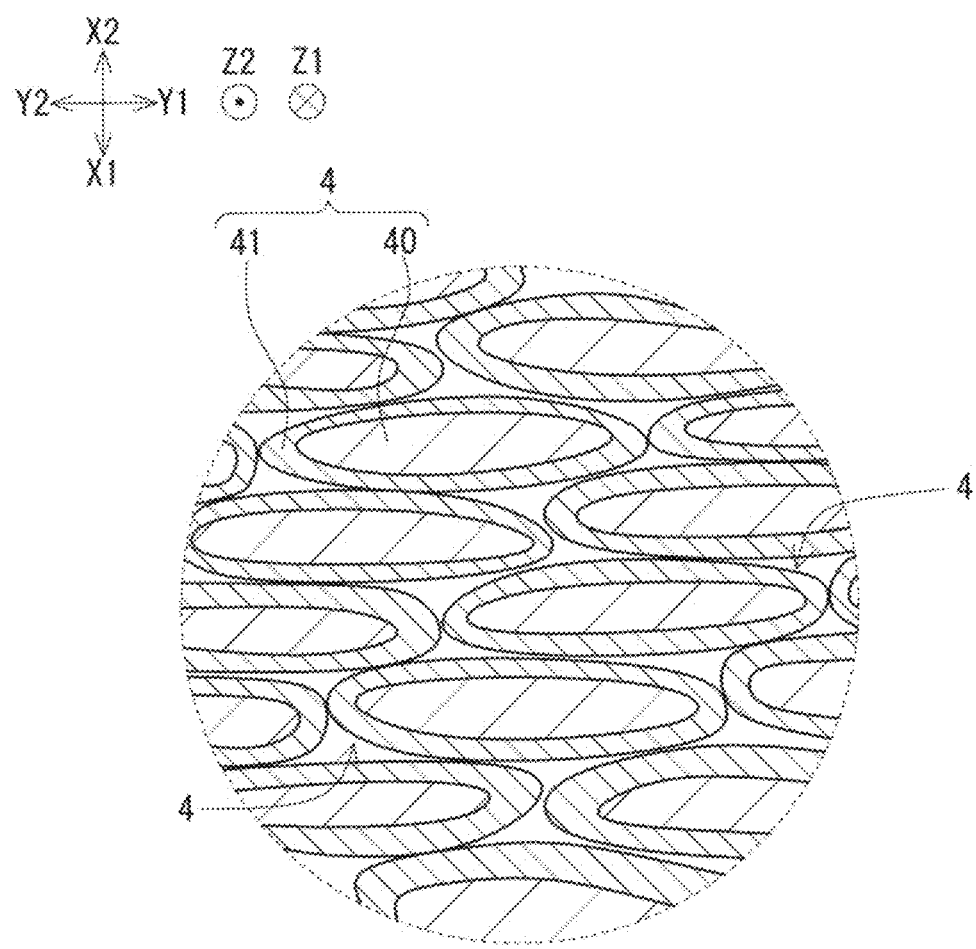
FIG. 9 is an enlarged view showing an outline of a portion enclosed by a dashed line in FIG. 5.
Figure 10:
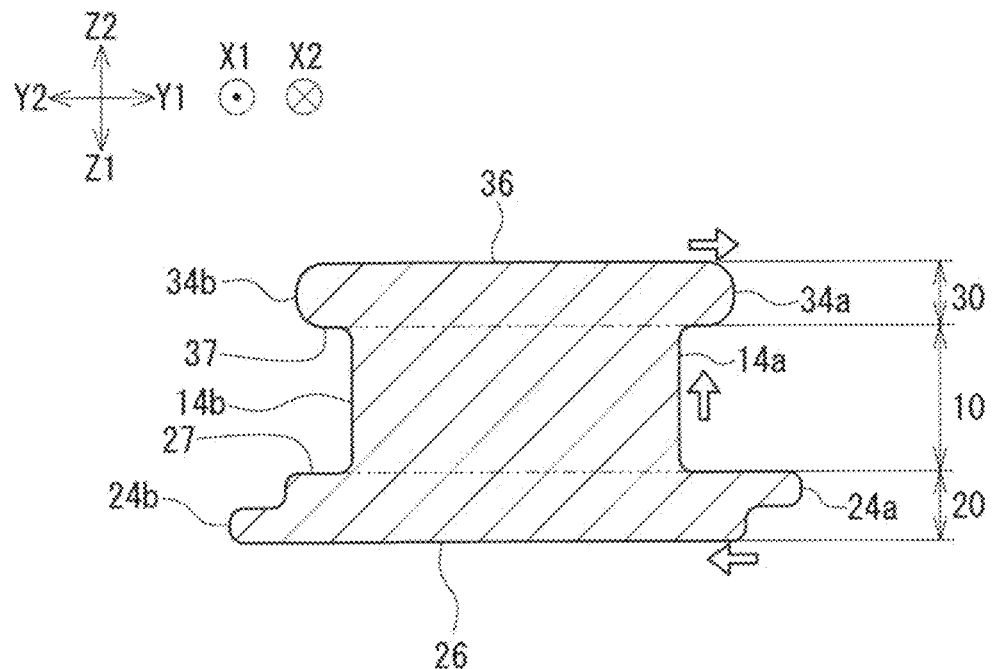
FIG. 10 is an X-X sectional view of the core piece shown in FIG. 2.

(c) In a second cross section of second member 20 shown in FIG. 5, a second average aspect ratio of soft magnetic particles 40 shown in FIG. 9 falls within a specific range.

The term "first member 10 and second member 20 are integrally molded" means that first member 10 and second member 20 are integrally formed by molding without mechanical connection using a screw or the like, or adhesion using an adhesive or the like.

In the present embodiment, core piece 1 includes a third member 30 in a plate form in addition to first member 10 and second member 20. Third member 30 is disposed on a second end side of the axial direction in first member 10. Core piece 1 is configured by a green compact in which first member 10, second member 20, and third member 30 are integrally molded. The term "first member 10, second member 20, and third member 30 are integrally molded" means that first member 10, second member 20, and third member 30 are integrally formed by molding without mechanical connection using a screw or the like, or adhesion using an adhesive or the like. Note that, as will be described later by referring to FIG. 15, core piece 1 need not include third member 30 as long as core piece 1 includes first member 10 and second member 20.

The direction along the radial direction of stator core 7 in core piece 1 is defined as an X-axial direction.

The direction along the axial direction of stator core 7 in core piece 1 is defined as a Z-axial direction.

The direction perpendicular to both the X-axial direction and the Z-axial direction of core piece 1 is defined as a Y-axial direction.

Of the X-axial direction, an inner peripheral side of stator core 7 in core piece 1 is defined as an X1 direction, and an outer peripheral side of stator core 7 is defined as an X2 direction.

Of the Z-axial direction, the side of the second member 20 with respect to first member 10 in core piece 1 is defined as a Z1 direction, and the side of the third member 30 with respect to first member 10 is defined as a Z2 direction.

The Z1 direction is the first end side of first member 10.

The Z2 direction is the second end side of first member 10.

Of the Y-axial direction, the first direction side of stator core 7 in core piece 1 is defined as a Y1 direction, and the second direction side of stator core 7 is defined as a Y2 direction.

[First Member]

Figure 18:
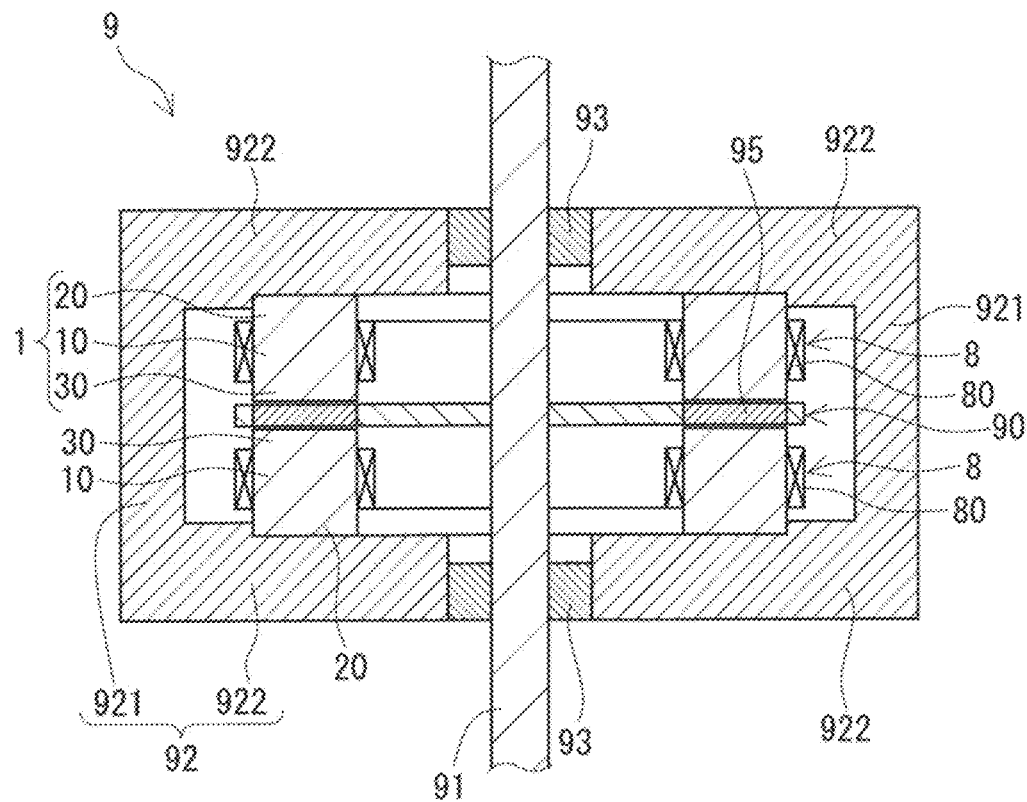
FIG. 18 is a sectional view showing an outline of a rotary electric machine according to a fifth embodiment.
Figure 19:
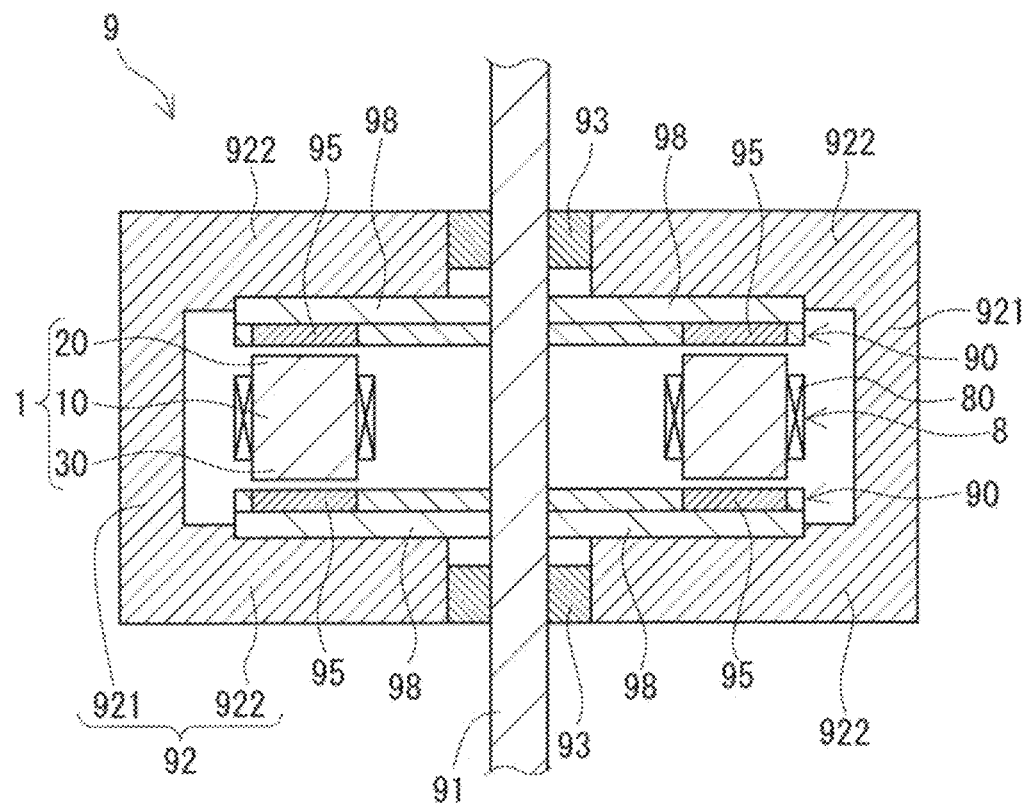
FIG. 19 is a sectional view showing an outline of a rotary electric machine according to a sixth embodiment.

First member 10 is a columnar member extending in the Z-axial direction. First member 10 constitutes teeth both in the case that core pieces 1 construct stator core 7 of double stator single rotor configuration in axial gap type rotary electric machine 9 and in the case that core pieces 1 construct stator core 7 of single stator double rotor configuration in axial gap type rotary electric machine 9. Axial gap type rotary electric machine 9 of double stator single rotor configuration is assembled such that one rotor 90 is sandwiched between two stators 8 as shown in FIG. 18. Axial gap type rotary electric machine 9 of single stator double rotor configuration is assembled such that one stator 8 is sandwiched between two rotors 90 as shown in FIG. 19. Hereinafter, for convenience of description, a double stator single rotor is sometimes referred to as DS/SR, and a single stator double rotor is sometimes referred to as SS/DR.

Figure 3:
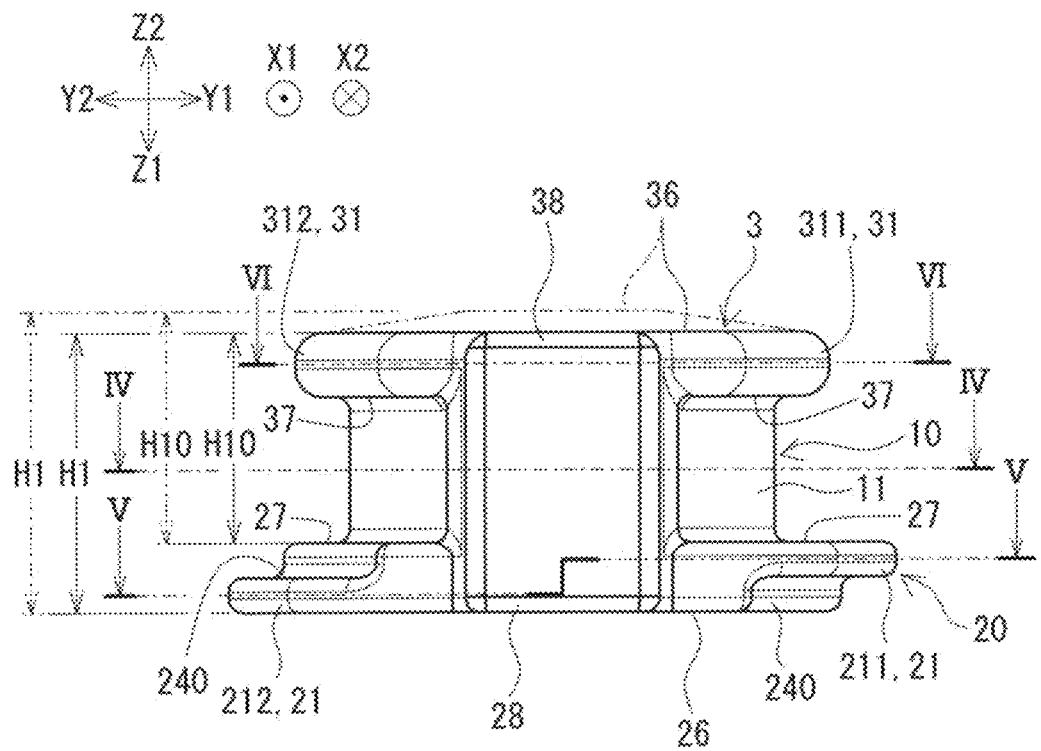
FIG. 3 is a view of the core piece according to the first embodiment seen from the side of an inner peripheral surface.

As shown in FIG. 3, a proportion of a second height H10 to a first height H1 of core piece 1 may be, for example, greater than or equal to 80%. Both first height H1 and second height H10 are lengths in the Z-axial direction. First height H1 is an entire length of core piece 1, that is, a length between a first end surface 26 of second member 20 and a first end surface 36 of third member 30 to be described later in the present embodiment. Second height H10 is a length of the region excluding the second member, that is, a total height of first member 10 and third member 30 in the present embodiment. Specifically, second height H10 is a length between a second end surface 27 of second member 20 and first end surface 36 of third member 30 to be described later. The larger the proportion, the more easily the effect of core piece 1 satisfying the configuration (b) is obtained. This effect will be described later. For example, the proportion may be greater than or equal to 82%, or may be particularly greater than or equal to 85%. The upper limit of the proportion may be, for example, 95%. That is, the proportion may be greater than or equal to 80% and less than or equal to 95%, further may be greater than or equal to 82% and less than or equal to 93%, or may be particularly greater than or equal to 85% and less than or equal to 90%.

Examples of the form of first member 10 include a prism and a cylinder. Examples of the prism include a quadratic prism having a quadrangular section shape in the plane perpendicular to the Z-axial direction. Examples of the quadratic prisms include a trapezoidal prism having a trapezoidal section shape. The section may be uniform in the Z-axial direction. The term "trapezoidal" implicates not only geometrically trapezoidal shapes but also those substantially regarded as trapezoids as is the shape having a rounded corner part shown in the present example. The term "trapezoidal" implicates trapezoids having legs with different lengths, such as a right trapezoid, as well as trapezoids having legs of the same length, such as an isosceles trapezoid. This point also applies to later-described second member 20, and third member 30.

Figure 4:
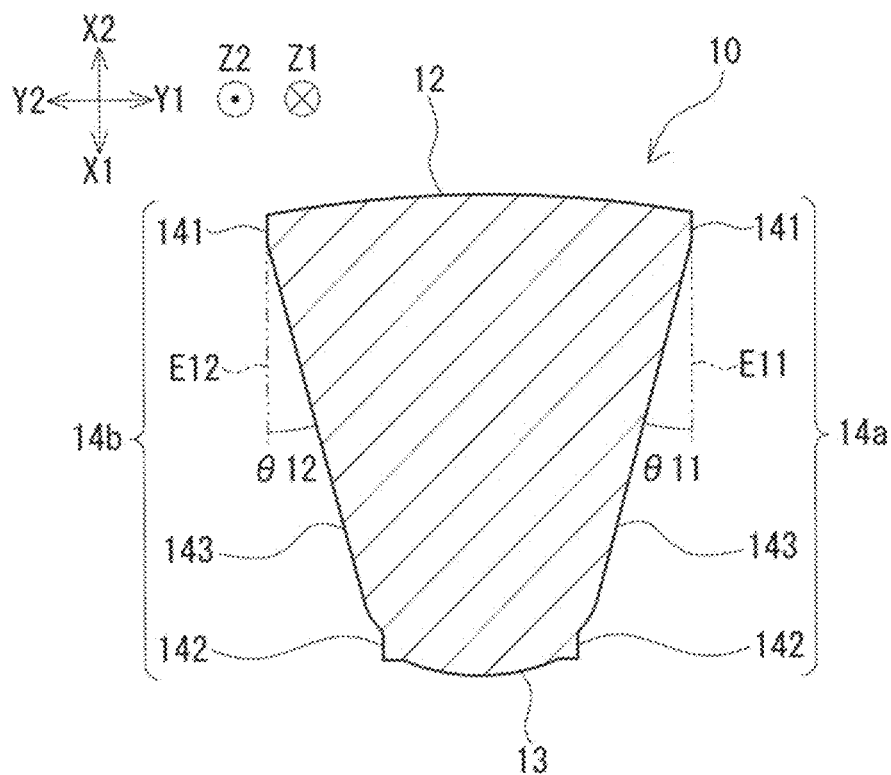
FIG. 4 is a IV-IV sectional view of the core piece shown in FIG. 3.

First member 10 in the present embodiment has a trapezoidal prism form in which the section shape is trapezoidal as shown in FIGS. 1 and 4. In the section shape, the length of the X2 direction side is long, and the length of the X1 direction side is short. The section shape of first member 10 is uniform in the Z-axial direction. When the first member 10 has a trapezoidal prism form, it is easy to ensure a large section area. It is also easy to reduce the dead space of core piece 1, and it is easy to construct stator 8 having a high space factor.

As shown in FIGS. 1 and 3, first member 10 has a peripheral surface 11 connecting with second member 20 and third member 30. Peripheral surface 11 of first member 10 shown in FIGS. 1 and 3 has an outer peripheral surface 12, an inner peripheral surface 13, a first lateral surface 14a, and a second lateral surface 14b as shown in FIG. 4. Outer peripheral surface 12 is located on the side of the X2 direction. Inner peripheral surface 13 is located on the side of the X1 direction. First lateral surface 14a and second lateral surface 14b are located on the sides leaving from each other in the circumferential direction of stator core 7 in core piece 1. In other words, first lateral surface 14a is located on the first direction side of the circumferential direction of stator core 7 in core piece 1. Second lateral surface 14b is located on the second direction side of the circumferential direction of stator core 7 in core piece 1. The positional relationships among outer peripheral surface 12, inner peripheral surface 13, first lateral surface 14a, and second lateral surface 14b also apply to later-described second member 20, and third member 30.

Outer peripheral surface 12 connects with the outer peripheral edge of first lateral surface 14a and the outer peripheral edge of second lateral surface 14b. Inner peripheral surface 13 connects with the inner peripheral edge of first lateral surface 14a and the inner peripheral edge of second lateral surface 14b. In other words, first lateral surface 14a and second lateral surface 14b connect with outer peripheral surface 12 and inner peripheral surface 13.

The length between first lateral surface 14a and second lateral surface 14b in outer peripheral surface 12 is longer than the length between first lateral surface 14a and second lateral surface 14b in inner peripheral surface 13. Outer peripheral surface 12 has a curved surface that is convex toward the X2 direction side in the present embodiment. Outer peripheral surface 12 may be configured by a flat surface. Inner peripheral surface 13 has a curved surface that is convex toward the X1 direction side in the present embodiment. Inner peripheral surface 13 may have a curved surface that is convex toward the X2 direction side, or may be configured by a flat surface. Bend radii of outer peripheral surface 12 and inner peripheral surface 13 may be the same or different from each other.

Each of first lateral surface 14a and second lateral surface 14b has a first parallel face 141, a second parallel face 142, and a first inclined face 143. First parallel faces 141 of first lateral surface 14a and second lateral surface 14b are parallel with each other. Second parallel faces 142 of first lateral surface 14a and second lateral surface 14b are parallel with each other. First parallel face 141 of first lateral surface 14a and second parallel face 142 of first lateral surface 14a are parallel with each other. First parallel face 141 and second parallel face 142 are surfaces that are parallel with the X-axial direction in core piece 1. The X-axial direction means the direction along the straight line that passes the center of stator core 7 and divides core piece 1 equally in the circumferential direction of stator core 7. First parallel face 141 connects with outer peripheral surface 12. Second parallel face 142 connects with inner peripheral surface 13. First inclined face 143 connects with first parallel face 141 and second parallel face 142.

It is preferred that the length along the X-axial direction of first parallel face 141 and second parallel face 142 is, for example, greater than or equal to 0.3 mm and less than or equal to 25 mm, although it depends on the size of core piece 1 or the like. When the length is greater than or equal to the above lower limit, it is possible to prevent a damage of a mold 5 accompanying the contact between a lower punch 55 and a die 50 as will be described later with reference to FIG. 11. Although a method for producing core piece 1 will be described later, it is possible to sufficiently apply a pressure on raw material powder forming core piece 1 when the length is greater than or equal to the above lower limit. When the length is less than or equal to the above upper limit, it is possible to increase the section area of first member 10, and thus it is possible to improve the torque and prevent iron loss in axial gap type rotary electric machine 9. The length along the X-axial direction of first parallel face 141 and second parallel face 142 is more preferably greater than or equal to 0.4 mm and less than or equal to 20 mm, and especially preferably greater than or equal to 0.5 mm and less than or equal to 15 mm. The aforementioned preferred ranges of the length along the X-axial direction of first parallel face 141 and second parallel face 142 in each of first lateral surface 14a and second lateral surface 14b of first member 10 also apply to a first parallel face 241 and a second parallel face 242 in each of a first lateral surface 24a and a second lateral surface 24b of second member 20, and a first parallel face 341 and a second parallel face 342 in each of a first lateral surface 34a and a second lateral surface 34b of third member 30 as described later.

As shown in FIG. 4, it is preferred that a first inclination angle θ11 and a second inclination angle θ12 of first inclined face 143 are, for example, greater than or equal to 5° and less than or equal to 20°. When first inclination angle θ11 and second inclination angle θ12 are greater than or equal to 5° and less than or equal to 20°, it is easy to wind a later-described coil on peripheral surface 11 of first member 10, and thus it is easy to construct stator core 7 shown in FIG. 16. First inclination angle θ11 and second inclination angle θ12 are further preferably greater than or equal to 5.5° and less than or equal to 18°, and especially preferably greater than or equal to 6° and less than or equal to 16°. First inclination angle θ11 and second inclination angle θ12 are preferably the same angle, but may be different from each other. First inclination angle θ1 means the angle formed by an extended plane E11 of first parallel face 141 and first inclined face 143 in first lateral surface 14a. Second inclination angle θ12 means the angle formed by an extended plane E12 of first parallel face 141 and first inclined face 143 in second lateral surface 14b.

[Second Member]

As shown in FIGS. 1 and 3, second member 20 is a plate-like member disposed on the first end side in the Z-axial direction of first member 10. Second member 20 constitutes a yoke when core pieces 1 construct stator core 7 provided in axial gap type rotary electric machine 9 of DS/SR configuration. Second member 20 constitutes a flange part when core pieces 1 construct stator core 7 provided in axial gap type rotary electric machine 9 of SS/DR configuration.

Second member 20 in the present embodiment has a trapezoidal plate form. In the trapezoidal plate form, the section shape of the plane perpendicular to the Z-axial direction of second member 20 is trapezoidal. The section may be uniform in the Z-axial direction. The form of second member 20 may be a rectangular plate when core pieces 1 construct stator core 7 provided in axial gap type rotary electric machine 9 of SS/DR configuration.

Figure 2:
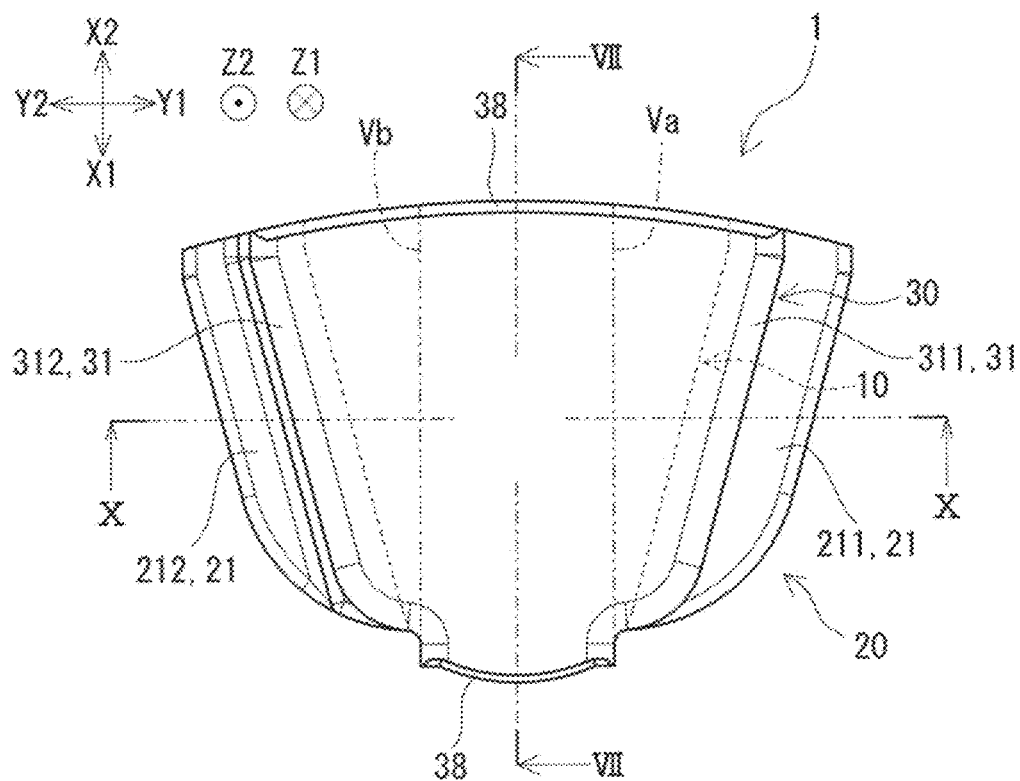
FIG. 2 is a top view showing an outline of a core piece according to the first embodiment.

As shown in FIG. 1 to FIG. 3, second member 20 has protruding portion 21. Protruding portion 21 projects outwardly from peripheral surface 11 of first member 10. Protruding portion 21 may protrude outwardly from peripheral surface 11 of first member 10 in part of peripheral surface 11 of first member 10, or may protrude outwardly from peripheral surface 11 of first member 10 over the entire periphery in the circumferential direction of first member 10. Protruding portion 21 has a first protruding part 211 and a second protruding part 212 in the present embodiment. First protruding part 211 projects on the first direction side of the circumferential direction of stator core 7. Second protruding part 212 projects on the second direction side of the circumferential direction of stator core 7. Protruding portion 21 may have a part projecting on the side of the X1 direction and a part projecting on the side of the X2 direction rather than having first protruding part 211 and second protruding part 212. Protruding portion 21 may have a part projecting on the side of the X1 direction and a part projecting on the side of the X2 direction in addition to first protruding part 211 and second protruding part 212. In this case, protruding portion 21 is circularly disposed.

The protruding length of first protruding part 211 and second protruding part 212 of second member 20 is longer than the protruding length of first protruding part 211 and second protruding part 212 of later-described third member 30 when core pieces 1 construct stator core 7 provided in axial gap type rotary electric machine 9 of DS/SR configuration. The protruding length of first protruding part 211 and second protruding part 212 of second member 20 may be the same as the protruding length of first protruding part 211 and second protruding part 212 of third member 30 when core pieces 1 construct stator core 7 provided in axial gap type rotary electric machine 9 of SS/DR configuration. The protruding length means the length along the direction perpendicular to peripheral surface 11 of first member 10. When peripheral surface 11 has a curved surface, the protruding length means the length along the normal direction of the curved surface.

As shown in FIGS. 3 and 5, second member 20 has an outer peripheral surface 22, an inner peripheral surface 23, first lateral surface 24a, second lateral surface 24b, a first end surface 26, and a second end surface 27. The positional relationships among outer peripheral surface 22, inner peripheral surface 23, first lateral surface 24a, and second lateral surface 24b are the same with to the positional relationships of respective surfaces in first member 10 as described above. First end surface 26 and second end surface 27 are located to face with each other. First end surface 26 is located on the side of the Z1 direction. First end surface 26 is located on the side of the Z1 direction of second member 20. Second end surface 27 is located on the side of the Z2 direction. Second end surface 27 is located on the side of first member 10 in second member 20. The positional relationship between first end surface 26 and second end surface 27 also applies to later-described third member 30.

Outer peripheral surface 22 connects with the outer peripheral edge of first lateral surface 24a, the outer peripheral edge of second lateral surface 24b, the outer peripheral edge of first end surface 26, and the outer peripheral edge of second end surface 27. Outer peripheral surface 22 of second member 20 connects with outer peripheral surface 12 of first member 10. Inner peripheral surface 23 connects with the inner peripheral edge of first lateral surface 24a, the inner peripheral edge of second lateral surface 24b, the inner peripheral edge of first end surface 26, and the inner peripheral edge of second end surface 27. Inner peripheral surface 23 of second member 20 connects with inner peripheral surface 13 of first member 10. First lateral surface 24a and second lateral surface 24b connect with outer peripheral surface 22 and inner peripheral surface 23. First end surface 26 connects with outer peripheral surface 22, first lateral surface 24a, second lateral surface 24b, and inner peripheral surface 23. Second end surface 27 connects with outer peripheral surface 22, first lateral surface 24a, second lateral surface 24b, inner peripheral surface 23, and peripheral surface 11 of first member 10.

The length between first lateral surface 24a and second lateral surface 24b in outer peripheral surface 22 is longer than the length between first lateral surface 24a and second lateral surface 24b in inner peripheral surface 23. The length between first lateral surface 24a and second lateral surface 24b in outer peripheral surface 22 of second member 20 is longer than the length between first lateral surface 14a and second lateral surface 14b in peripheral surface 11 of first member 10. The length between first lateral surface 24a and second lateral surface 24b in inner peripheral surface 23 in second member 20 is the same as the length between first lateral surface 14a and second lateral surface 14b in inner peripheral surface 13 in first member 10.

Outer peripheral surface 22 has a curved surface that is convex toward the X2 direction side in the present embodiment Outer peripheral surface 22 may be configured by a flat surface. Inner peripheral surface 23 has a curved surface that is convex toward the X1 direction side in the present embodiment Inner peripheral surface 23 may have a curved surface that is convex toward the X2 direction side, or may be configured by a flat surface. Bend radii of outer peripheral surface 22 and inner peripheral surface 23 may be the same or different from each other.

Each of first lateral surface 24a and second lateral surface 24b has first parallel face 241, second parallel face 242, and a first inclined face 243. First parallel faces 241 of first lateral surface 24a and second lateral surface 24b are parallel with each other. Second parallel faces 242 of first lateral surface 24a and second lateral surface 24b are parallel with each other. First parallel face 241 of first lateral surface 24a and second parallel face 242 of first lateral surface 24a are parallel with each other. First parallel face 241 and second parallel face 242 are planes that are parallel with the X-axial direction of core piece 1. First parallel face 241 connects with outer peripheral surface 22. Second parallel face 242 connects with inner peripheral surface 23. First inclined face 243 connects with first parallel face 241 and second parallel face 242.

As shown in FIG. 5, it is preferred that a first inclination angle θ21 and a second inclination angle θ22 of first inclined face 243 are, for example, greater than or equal to 5° and less than or equal to 20°. When first inclination angle θ21 and second inclination angle θ22 are greater than or equal to 5° and less than or equal to 20°, it is easy to arrange core pieces 1 circularly, and it is easy to construct stator core 7. First inclination angle θ21 and second inclination angle θ22 are further preferably greater than or equal to 5.5° and less than or equal to 18°, and especially preferably greater than or equal to 6° and less than or equal to 16°. First inclination angle θ21 and second inclination angle θ22 are preferably the same angle, but may be different from each other. First inclination angle θ21 means the angle formed by an extended plane E21 of first parallel face 241 and first inclined face 243 in first lateral surface 24a. Second inclination angle θ22 means the angle formed by an extended plane E22 of first parallel face 241 and first inclined face 243 in second lateral surface 24b.

When core pieces 1 construct stator core 7 provided in axial gap type rotary electric machine 9 of DS/SR configuration, regarding first core piece 1 and second core piece 1 adjoining in the circumferential direction of stator core 7, first lateral surface 24a in second member 20 of first core piece 1, and second lateral surface 24b in second member 20 of second core piece 1 are in contact with each other. In this case, it is preferred that first inclined face 243 in first lateral surface 24a has a projecting part 244 projecting outwardly from a first imaginary plane V21. It is preferred that first inclined face 243 in second lateral surface 24b has projecting part 244 projecting outwardly from a second imaginary plane V22.

First imaginary plane V21 is a plane that connects a first connection part and a second connection part in first lateral surface 24a of first protruding part 211. The first connection part in first lateral surface 24a is a part where first parallel face 241 and first inclined face 243 of first lateral surface 24a are connected. The second connection part in first lateral surface 24a is a part where second parallel face 242 of first lateral surface 24a and inner peripheral surface 23 are connected. Second imaginary plane V22 is a plane that connects a first connection part and a second connection part in second lateral surface 24b of second protruding part 212. The first connection part in second lateral surface 24b is a part where first parallel face 241 and first inclined face 243 of second lateral surface 24b are connected. The second connection part in second lateral surface 24b is a part where second parallel face 242 of second lateral surface 24b and inner peripheral surface 23 are connected. First imaginary plane V21 and second imaginary plane V22 are indicated by two-dot chain lines extending diagonally with respect to the paper surface in FIG. 5.

Since first inclined face 243 in each of first lateral surface 24a and second lateral surface 24b has projecting part 244, the magnetic path area of stator core 7 tends to increase. The reason is as follows. For example, a core piece in which each of first lateral surface 24a and second lateral surface 24b has first parallel face 241, second parallel face 242, and first inclined face 243, and first inclined face 243 does not have projecting part 244 is as follows. In circularly arranging such core pieces, if one attempts to bring first lateral surface 24a of a first core piece and second lateral surface 24b of a second core piece adjoining in the circumferential direction of stator core 7 into contact with each other, a first corner part of the first core piece and a second corner part of the second core piece come into contact with each other. The first corner part is a corner part between first lateral surface 24a and inner peripheral surface 23. The second corner part is a corner part between second lateral surface 24b and inner peripheral surface 23. Therefore, it is impossible to sufficiently bring first lateral surface 24a of the first core piece 1 and second lateral surface 24b of the second core piece into contact with each other. In other words, the contact area between first lateral surface 24a of the first core piece 1 and second lateral surface 24b of the second core piece decreases.

In contrast to this, in core piece 1, first lateral surface 24a has first parallel face 241, second parallel face 242, and first inclined face 243, and first inclined face 243 has projecting part 244 projecting outwardly from first imaginary plane V21. In addition, in core piece 1, second lateral surface 24b has first parallel face 241, second parallel face 242, and first inclined face 243, and first inclined face 243 has projecting part 244 projecting outwardly from second imaginary plane V22. In circularly arranging core pieces 1, if one brings first lateral surface 24a of first core piece 1 and second lateral surface 24b of second core piece 1 into contact with each other, the first corner part of first core piece 1 and the second core part of second core piece 1 can be prevented from coming into contact with each other. Therefore, it is possible to sufficiently bring first lateral surface 24a of first core piece 1 and second lateral surface 24b of second core piece 1 into contact with each other. In other words, the contact area between first lateral surface 24a of first core piece 1 and second lateral surface 24b of second core piece 1 increases.

When core pieces 1 construct stator core 7 provided in axial gap type rotary electric machine 9 of DS/SR configuration, regarding first core piece 1 and second core piece 1 adjoining in the circumferential direction of stator core 7, first lateral surface 24a in second member 20 of first core piece 1, and second lateral surface 24b in second member 20 of second core piece 1 are in contact with each other, as described above. In this case, it is preferred that first lateral surface 24a and second lateral surface 24b of core piece 1 respectively have steps 240 that can be fitted with each other as shown in FIG. 3. As result, magnetic path area of stator core 7 tends to increase. First core piece 1 and second core piece 1 adjoining in the circumferential direction of stator core 7 are fitted with each other by means of step 240 of first lateral surface 24a of first protruding part 211 in second member 20 of first core piece 1 and step 240 of second lateral surface 24b of second protruding part 212 in second member 20 of second core piece 1. Therefore, it is possible to sufficiently bring first core piece 1 and second core piece 1 into contact with each other, and it is possible to increase the contact area between core pieces 1 adjoining in the circumferential direction of stator core 7. Step 240 of first lateral surface 24a is disposed on the side of first end surface 26. Step 240 of first lateral surface 24a is configured to leave first lateral surface 14a of first member 10 as step 240 approaches second end surface 27 from first end surface 26. On the other hand, step 240 of second lateral surface 24b is disposed on the side of second end surface 27. Step 240 of second lateral surface 24b is configured to leave second lateral surface 14b of first member 10 as step 240 approaches first end surface 26 from second end surface 27.

Although omitted in drawings, first lateral surface 24a of core piece 1 may have at least one of a recess or a protrusion rather than a step. Second lateral surface 24b may have at least one of a protrusion corresponding to the recess of first lateral surface 24a or a recess corresponding to the protrusion of first lateral surface 24a. That is, each of first lateral surface 24a and second lateral surface 24b may have a recess and a protrusion. Either one lateral surface of first lateral surface 24a or second lateral surface 24b may have only a recess, and the other lateral surface may have only a protrusion. The number and the shape of recesses and protrusions are not particularly limited.

Although omitted in drawings, first lateral surface 24a and second lateral surface 24b of core piece 1 may respectively have second inclined faces that are in contact with each other, rather than steps or recesses and protrusions. For example, the second inclined face of first lateral surface 24a may be inclined outwardly as it approaches second end surface 27 from first end surface 26. And, the second inclined face of second lateral surface 24b may be inclined outwardly as it approaches first end surface 26 from second end surface 27.

When core pieces 1 construct stator core 7 provided in axial gap type rotary electric machine 9 of SS/DR configuration, core pieces 1 are circularly arranged such that they are out of contact with each other. In this case, each of first lateral surface 24a and second lateral surface 24b need not have all of steps 240, recesses, protrusions, and second inclined faces that can be fitted with each other.

The corner part between first lateral surface 24a and first end surface 26, and the corner part between first lateral surface 24a and second end surface 27 are rounded. The corner part between second lateral surface 24b and first end surface 26, and the corner part between second lateral surface 24b and second end surface 27 are rounded.

Figure 16:
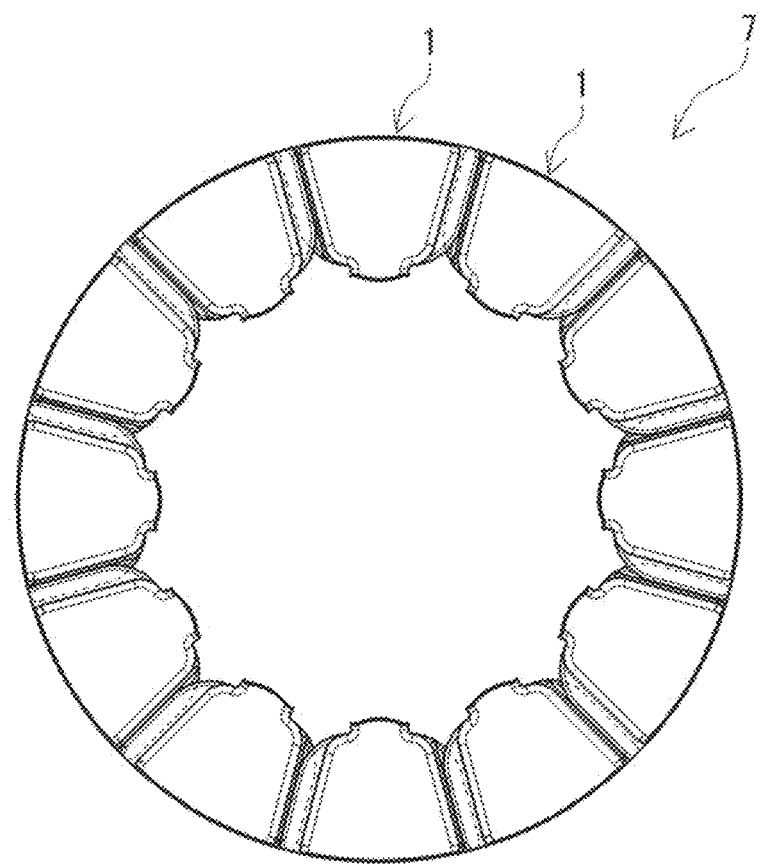
FIG. 16 is a perspective view showing an outline of a stator core according to a third embodiment.
Figure 17:
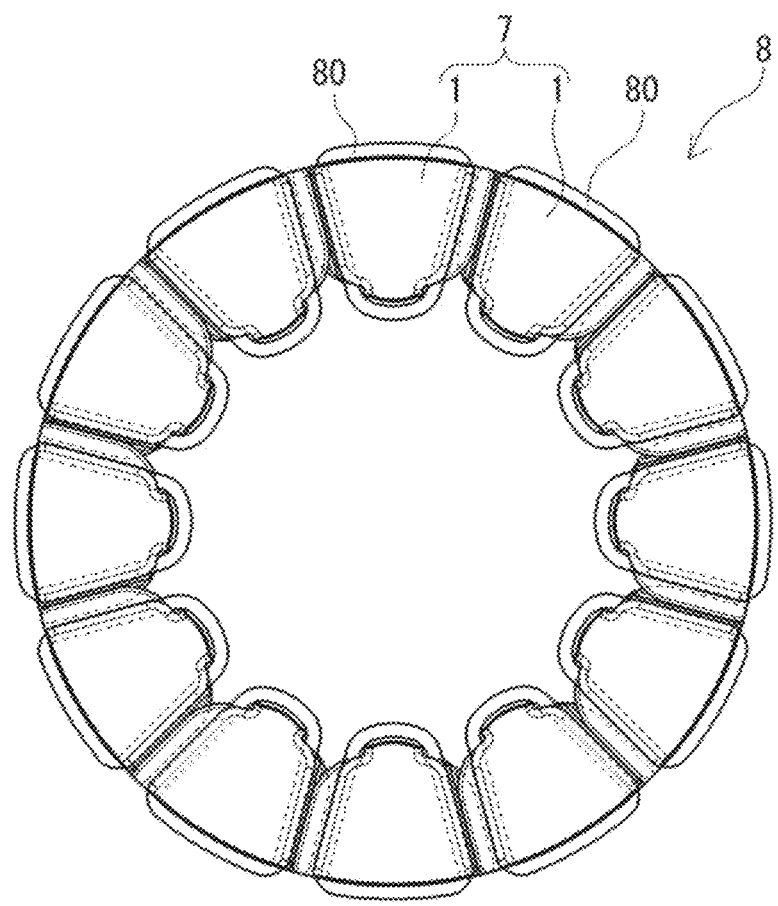
FIG. 17 is a perspective view showing an outline of a stator according to a fourth embodiment.

When core pieces 1 construct stator core 7 provided in axial gap type rotary electric machine 9 of DS/SR configuration, first end surface 26 may be configured by a flat surface. When core pieces 1 construct stator core 7 provided in axial gap type rotary electric machine 9 of SS/DR configuration, first end surface 26 may be configured by a flat surface, or may be configured in a convex shape toward the Z1 direction side. Such core pieces 1 can construct axial gap type rotary electric machine 9 generating little noises and vibrations. The reason is as follows. In axial gap type rotary electric machine 9 of SS/DR configuration, as shown in FIG. 19, stator 8 and rotor 90 are arranged to face with each other. As shown in FIG. 17, stator 8 includes stator core 7 and a coil 80. As shown in FIGS. 16 and 17, stator core 7 is configured by circularly arranging plural core pieces 1. As shown in FIG. 17, coil 80 is arranged on first member 10 of each core piece 1. When first end surface 26 of second member 20 of core piece 1 is formed to have a convex shape, abrupt change in the magnetic flux of a magnet 95 of rotor 90 received by core piece 1 is easily suppressed in axial gap type rotary electric machine 9 shown in FIG. 19. Therefore, cogging torque is easily reduced. Since the cogging torque is small, noises and vibrations are difficult to increase.

It is preferred that a corner part 28 between first end surface 26 and inner peripheral surface 23, and a corner part 28 between first end surface 26 and outer peripheral surface 22 are chamfered. These corner parts 28 are difficult to be damaged since they are chamfered. The chamfering may be C chamfering or R chamfering.

It is preferred that a chamfering length of corner part 28 is, for example, greater than or equal to 0.1 mm and less than or equal to 0.5 mm. In a case of C chamfering, the chamfering length refers to the length of a short side of two sides excluding a hypotenuse of a right triangle having corner part 28 as the hypotenuse. In a case of R chamfering, the chamfering length refers to a length of a short side of two sides excluding a hypotenuse of a right triangle having, as the hypotenuse, a line segment connecting, by a straight line, inflection points between a curved surface of corner part 28 and each surface continuous with the curved surface. When the chamfering length falls within the above-described range, corner part 28 is difficult to be damaged. It is further preferred that the chamfering length is greater than or equal to 0.15 mm and less than or equal to 0.45 mm, or particularly greater than or equal to 0.2 mm and less than or equal to 0.4 mm.

[Third Member]

As shown in FIGS. 1 and 3, third member 30 is a plate-like member disposed on the second end side in the Z-axial direction of first member 10. Third member 30 constitutes a flange part both in the case that core pieces 1 construct stator core 7 provided in axial gap type rotary electric machine 9 of DS/SR configuration, and in the case that core pieces 1 construct stator core 7 provided in axial gap type rotary electric machine 9 of SS/DR configuration.

Third member 30 in the present embodiment has a trapezoidal plate form. In the trapezoidal plate form, the section shape of the plane perpendicular to the Z-axial direction of third member 30 is trapezoidal. The section may be uniform in the Z-axial direction. The form of third member 30 may be a rectangular plate. For example, in core piece 1, first member 10 may be a trapezoidal prism, and at least one of second member 20 or third member 30 may be a rectangular plate.

As shown in FIG. 1 to FIG. 3, third member 30 has protruding portion 31. Protruding portion 31 projects outwardly from peripheral surface 11 of first member 10. Protruding portion 31 may protrude outwardly from peripheral surface 11 of first member 10 in part of peripheral surface 11 of first member 10, or may protrude outwardly from peripheral surface 11 of first member 10 over the entire periphery in the circumferential direction of first member 10. Protruding portion 31 has a first protruding part 311 and a second protruding part 312 in the present embodiment. First protruding part 311 projects on the first direction side of the circumferential direction of stator core 7. Second protruding part 312 projects on the second direction side of the circumferential direction of stator core 7. Protruding portion 31 may have at least one of a part projecting on the side of the X1 direction or a part projecting on the side of the X2 direction rather than having first protruding part 311 and second protruding part 312. Protruding portion 31 may have apart projecting on the side of the X1 direction and a part projecting on the side of the X2 direction in addition to first protruding part 311 and second protruding part 312. In this case, protruding portion 31 is circularly disposed.

The protruding length of first protruding part 311 and second protruding part 312 of third member 30 is shorter than the protruding length of first protruding part 311 and second protruding part 312 of second member 20 when core pieces 1 construct stator core 7 provided in axial gap type rotary electric machine 9 of DS/SR configuration, as described above. The protruding length of first protruding part 311 and second protruding part 312 of third member 30 may be the same as the protruding length of first protruding part 211 and second protruding part 212 of second member 20 when core pieces 1 construct stator core 7 provided in axial gap type rotary electric machine 9 of SS/DR configuration, as described above.

Figure 6:
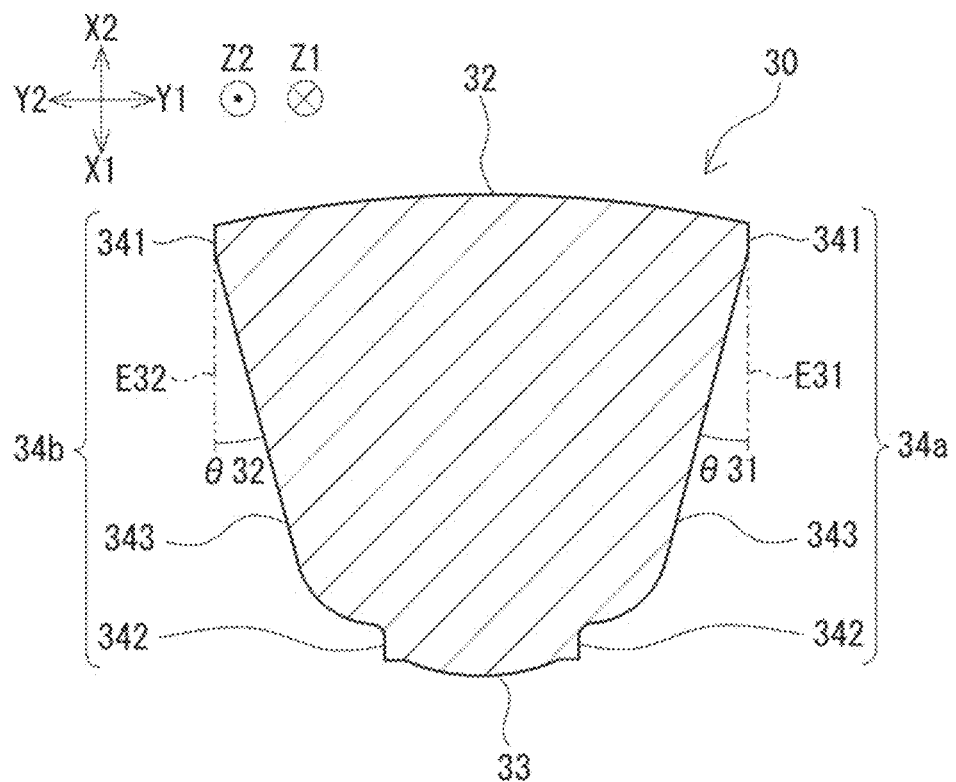
FIG. 6 is a VI-VI sectional view of the core piece shown in FIG. 3.

As shown in FIG. 6, third member 30 has an outer peripheral surface 32, an inner peripheral surface 33, first lateral surface 34a, a second lateral surface 34b, a first end surface 36, and a second end surface 37. The positional relationships among outer peripheral surface 32, inner peripheral surface 33, first lateral surface 34a, and second lateral surface 34b are the same with the positional relationships of respective surfaces in first member 10 as described above. The positional relationship between first end surface 36 and second end surface 37 is the same with the positional relationship of respective surfaces in second member 20 as described above.

Outer peripheral surface 32 connects with the outer peripheral edge of first lateral surface 34a, the outer peripheral edge of second lateral surface 34b, the outer peripheral edge of first end surface 36, and the outer peripheral edge of second end surface 37. Outer peripheral surface 32 of third member 30 connects with outer peripheral surface 12 of first member 10. Inner peripheral surface 33 connects with the inner peripheral edge of first lateral surface 34a, the inner peripheral edge of second lateral surface 34b, the inner peripheral edge of first end surface 36, and the inner peripheral edge side of second end surface 37. Inner peripheral surface 33 of third member 30 connects with inner peripheral surface 13 of first member 10. First lateral surface 34a and second lateral surface 34b connect with outer peripheral surface 32 and inner peripheral surface 33. First end surface 36 connects with outer peripheral surface 32, first lateral surface 34a, second lateral surface 34b, and inner peripheral surface 33. Second end surface 37 connects with outer peripheral surface 32, first lateral surface 34a, second lateral surface 34b, inner peripheral surface 33, and peripheral surface 11 of first member 10.

The length between first lateral surface 34a and second lateral surface 34b in outer peripheral surface 32 is longer than the length between first lateral surface 34a and second lateral surface 34b in inner peripheral surface 33. The length between first lateral surface 34a and second lateral surface 34b in outer peripheral surface 32 of third member 30 is longer than the length between first lateral surface 14a and second lateral surface 14b in outer peripheral surface 12 of first member 10. The length between first lateral surface 34a and second lateral surface 34b in outer peripheral surface 32 of third member 30 is shorter than the length between first lateral surface 24a and second lateral surface 24b in outer peripheral surface 22 of second member 20. The length between first lateral surface 34a and second lateral surface 34b in inner peripheral surface 33 of third member 30 is the same as the length between first lateral surface 14a and second lateral surface 14b in inner peripheral surface 13 of first member 10. In other words, the length between first lateral surface 14a and second lateral surface 14b in inner peripheral surface 13 of first member 10, the length between first lateral surface 24a and second lateral surface 24b in inner peripheral surface 23 of second member 20, and the length between first lateral surface 34a and second lateral surface 34b in inner peripheral surface 33 of third member 30 are mutually the same.

Outer peripheral surface 32 has a curved surface that is convex toward the X2 direction side in the present embodiment. Outer peripheral surface 32 may be configured by a flat surface. Inner peripheral surface 33 has a curved surface that is convex toward the X1 direction side in the present embodiment. Inner peripheral surface 33 may have a curved surface that is convex toward the X2 direction side, or may be configured by a flat surface. Bend radii of outer peripheral surface 32 and inner peripheral surface 33 may be the same or different from each other.

Bend radii of at least two outer peripheral surfaces among outer peripheral surface 12, outer peripheral surface 22, and outer peripheral surface 32 may be the same. Of course, all bend radii of outer peripheral surface 12, outer peripheral surface 22, and outer peripheral surface 32 may be the same. All bend radii of outer peripheral surface 12, outer peripheral surface 22, and outer peripheral surface 32 may be different from one another. Bend radii of at least two inner peripheral surfaces among inner peripheral surface 13, inner peripheral surface 23, and inner peripheral surface 33 may be the same. Of course, all bend radii of inner peripheral surface 13, inner peripheral surface 23, and inner peripheral surface 33 may be the same. All bend radii of inner peripheral surface 13, inner peripheral surface 23, and inner peripheral surface 33 may be different from one another.

Each of first lateral surface 34a and second lateral surface 34b has first parallel face 341, second parallel face 342, and a first inclined face 343. First parallel faces 341 of first lateral surface 34a and second lateral surface 34b are parallel with each other. Second parallel faces 342 of first lateral surface 34a and second lateral surface 34b are parallel with each other. First parallel face 341 of first lateral surface 34a and second parallel face 342 of first lateral surface 34a are parallel with each other. First parallel face 341 and second parallel face 342 are planes that are parallel with the X-axial direction of core piece 1. First parallel face 341 connects with outer peripheral surface 32. Second parallel face 342 connects with inner peripheral surface 33. First inclined face 343 connects with first parallel face 341 and second parallel face 342.

As shown in FIG. 6, it is preferred that a first inclination angle θ31 and a second inclination angle θ32 of first inclined face 343 are, for example, greater than or equal to 5° and less than or equal to 20°. When first inclination angle θ31 and second inclination angle θ32 are greater than or equal to 5° and less than or equal to 20°, variation in density of core pieces 1 can be reduced. First inclination angle θ31 and second inclination angle θ32 are further preferably greater than or equal to 5.5° and less than or equal to 18°, and especially preferably greater than or equal to 6° and less than or equal to 16°. First inclination angle θ31 and second inclination angle θ32 are preferably the same angle, but may be different from each other. First inclination angle θ31 means the angle formed by an extended plane E31 of first parallel face 341 and first inclined face 343 in first lateral surface 34a. Second inclination angle θ32 means the angle formed by an extended plane E32 of first parallel face 341 and first inclined face 343 in second lateral surface 34b.

Among first inclination angle θ11, first inclination angle θ21, and first inclination angle θ31, at least two inclination angles may be the same. Among second inclination angle θ12, second inclination angle θ22, and second inclination angle θ32, at least two inclination angles may be the same. Of course, all of first inclination angle θ11, first inclination angle θ21, and first inclination angle θ31 may be the same. All of second inclination angle θ12, second inclination angle θ22, second inclination angle θ32 may be the same. All of first inclination angle θ11, first inclination angle θ21, and first inclination angle θ31 may be different from one another. All of second inclination angle θ12, second inclination angle θ22, and second inclination angle θ32 may be different from one another.

The corner part between first lateral surface 34a and first end surface 36, and the corner part between first lateral surface 34a and second end surface 37 are rounded. The corner part between second lateral surface 34b and first end surface 36, and the corner part between second lateral surface 34b and second end surface 37 are rounded.

First end surface 36 may be configured by a flat surface as indicated by a solid line in FIG. 3, or may be formed to have a convex shape toward the Z2 direction side as indicated by a two-dot chain line in FIG. 3 both in the case that core pieces 1 construct stator core 7 provided in axial gap type rotary electric machine 9 of DS/SR configuration, and in the case that core pieces 1 construct stator core 7 provided in axial gap type rotary electric machine 9 of SS/DR configuration. When first end surface 36 is formed to have a convex shape, it is possible to construct axial gap type rotary electric machine 9 generating little noises and vibrations. The reason is as follows. As shown in FIG. 18 or 19, in axial gap type rotary electric machine 9, stator 8 and rotor 90 are arranged to face with each other. As shown in FIG. 17, stator 8 includes stator core 7 and a coil 80. As shown in FIGS. 16 and 17, stator core 7 is configured by circularly arranging plural core pieces 1. As shown in FIG. 17, coil 80 is arranged on first member 10 of each core piece 1. By forming first end surface 36 of third member 30 of core piece 1 to have a convex shape as indicated by a two-dot line in FIG. 3, abrupt change in the magnetic flux of magnet 95 of rotor 90 received by core piece 1 is easily suppressed in axial gap type rotary electric machine 9 shown in FIGS. 18 and 19. Therefore, cogging torque is easily reduced. Since the cogging torque is small, noises and vibrations are difficult to increase.

It is preferred that a corner part 38 between first end surface 36 and outer peripheral surface 32, and a corner part 38 between first end surface 36 and inner peripheral surface 33 are chamfered. These corner parts 38 are difficult to be damaged since they are chamfered. The chamfering may be C chamfering or R chamfering. As with the chamfering length of corner part 28, it is preferred that a chamfering length of corner part 38 is, for example, greater than or equal to 0.1 mm and less than or equal to 0.5 mm, further greater than or equal to 0.15 mm and less than or equal to 0.45 mm, or particularly greater than or equal to 0.2 mm and less than or equal to 0.4 mm.

[Joint]

A first joint between protruding portion 21 of second member 20 and peripheral surface 11 of first member 10, and a second joint between protruding portion 31 of third member 30 and peripheral surface 11 of first member 10 are rounded as shown in FIG. 3. In the present embodiment, the first joint has a joint between first protruding part 211 of second member 20 and peripheral surface 11 of first member 10, and a joint between second protruding part 212 of second member 20 and peripheral surface 11 of first member 10. These joints are rounded. The second joint has a joint between first protruding part 311 of third member 30 and peripheral surface 11 of first member 10, and a joint between second protruding part 312 of third member 30 and peripheral surface 11 of first member 10. These joints are rounded. Since each joint has a rounded shape, core piece 1 is difficult to be damaged starting from such a joint.

It is preferred that the bend radius of the first joint and the bend radius of the second joint are greater than or equal to 0.2 mm and less than or equal to 4.0 mm. Since the bend radii of the first joint and the second joint are greater than or equal to 0.2 mm, the load on the mold at the time of producing core piece 1 is small. Since the bend radii of the first joint and the second joint are less than or equal to 4.0 mm, it is easy to wind coil 80 at the time of constructing stator 8 described later by referring to FIG. 17, and thus it is easy to increase the number of windings of coil 80. The bend radius of the first joint and the bend radius of the second joint are more preferably greater than or equal to 0.3 mm and less than or equal to 3.0 mm, and especially preferably greater than or equal to 0.5 mm and less than or equal to 2.0 mm. The bend radius of the first joint and the bend radius of the second joint may be the same or different from each other.

[Area Ratio]

The total area of outer peripheral surface 12, 22, 32 in each of first member 10, second member 20, and third member 30 is preferably more than 1 time and less than or equal to 4 times the total area of inner peripheral surface 13, 23, 33 in each of first member 10, second member 20, and third member 30. Core piece 1 in which the total area of outer peripheral surface 12, 22, 32 is more than 1 time the total area of inner peripheral surface 13, 23, 33 is easy to arrange circularly, and easy to construct stator core 7. Core piece 1 in which the total area of outer peripheral surface 12, 22, 32 is less than or equal to 4 times the total area of inner peripheral surface 13, 23, 33 is easy to produce. Since the proportion of the total area of inner peripheral surface 13, 23, 33 is relatively large, the area pushing out by lower punch 55 is large at the time of removing core piece 1 from mold 5. Therefore, it is easy to prevent a damage of core piece 1 at the time of removing core piece 1 from mold 5.

The total area of outer peripheral surface 12, 22, 32 is further preferably greater than or equal to 1.2 times and less than or equal to 3.8 times, especially preferably greater than or equal to 1.5 times and less than or equal to 3.5 times the total area of inner peripheral surface 13, 23, 33.

[Materials]

As shown in FIGS. 8 and 9, the green compact has a plurality of soft magnetic particles 40. It is preferred that the green compact is configured by an aggregate of a plurality of coated soft magnetic particles 4. Each coated soft magnetic particles 4 includes soft magnetic particle 40 and an insulating coating 41 covering the surface of soft magnetic particle 40. Formation of insulating coating 41 makes it easy to ensure the electric insulation between soft magnetic particles 40 by means of insulating coating 41. Therefore, it is possible to reduce the core loss of the green compact caused by the eddy current loss. Examples of the material of soft magnetic particles 40 include pure iron and an iron-based alloy. Pure iron refers to those having a purity of Fe (iron) of greater than or equal to 99% by mass. An iron-based alloy contains at least one element of Si (silicon) or Al (aluminum), and the remainder is composed of Fe and inevitable impurities. Examples of an iron-based alloy include at least one selected from the group consisting of an Fe—Si alloy, an Fe—Al alloy, and an Fe—Si—Al alloy. Examples of the Fe—Si alloy include silicon steel. Examples of the Fe—Si—Al alloy include sendust. Since the above materials are relatively soft, soft magnetic particles 40 are easy to deform at the time of molding the green compact. Therefore, core piece 1 has high density and is excellent in accuracy of dimension. Examples of insulating coating 41 include phosphate coating and silica coating.

[Shape of Soft Magnetic Particles]

The green compact is produced by compression molding soft magnetic powder having a plurality of soft magnetic particles 40. Alternatively, the green compact is produced by compression molding coated soft magnetic powder having a plurality of coated soft magnetic particles 4. That is, the shape of soft magnetic particles 40 is a flat shape. Soft magnetic particles 40 have a major axis and a minor axis in the first cross section of first member 10, the second cross section of second member 20, and a third cross section of third member 30 to be described later.

[First Average Aspect Ratio]

In the first cross section of first member 10 shown in FIG. 7, the first average aspect ratio of soft magnetic particles 40 shown in FIG. 8 is greater than or equal to 1.2. The first cross section is a cross section taken along the X-axial direction and the Z-axial direction. The first average aspect ratio is a ratio L11/L12 between an average length L11 and an average length L12 in the first cross section. Average length L11 is an average of lengths of soft magnetic particles 40 in the X-axial direction. Average length L12 is an average of lengths of soft magnetic particles 40 in the Z-axial direction. As the first average aspect ratio is larger, the length of soft magnetic particles 40 in the Z-axial direction is longer than the length in the X-axial direction in the first cross section of first member 10.

In the first cross section of first member 10, a first field of view having a square shape is taken. The first field of view is taken so as to have a pair of first sides along the Z-axial direction and a pair of second sides along the X-axial direction. When the first average aspect ratio of soft magnetic particles 40 is greater than or equal to 1.2, the number of soft magnetic particles 40 arranged in parallel in the Z-axial direction is smaller than the number of soft magnetic particles 40 arranged in parallel in the X-axial direction in the first field of view. That is, in the first field of view, the number of grain boundaries dividing the Z-axial direction is small. The grain boundary refers to a space between adjacent soft magnetic particles.

It is preferred that the first average aspect ratio is greater than or equal to 1.25, or particularly greater than or equal to 1.3. The upper limit of the first average aspect ratio is, for example, about 1.7. That is, it is preferred that the first average aspect ratio is greater than or equal to 1.2 and less than or equal to 1.7, further greater than or equal to 1.25 and less than or equal to 1.6, or particularly greater than or equal to 1.3 and less than or equal to 1.5.

Average length L11 and average length L12 are obtained as follows. In the first cross section, a first imaginary line is drawn in the X-axial direction. A length of the first imaginary line may be, for example, 1000 μm. The number of soft magnetic particles 40 present on the first imaginary line is counted. The length of the first imaginary line is divided by the total number of soft magnetic particles 40 thus counted. A value obtained by the division is taken as length L11. Likewise, in the first cross section, a second imaginary line is drawn in the Z-axial direction. A length of the second imaginary line may be, for example, 1000 μm. The number of soft magnetic particles 40 present on the second imaginary line is counted. The length of the second imaginary line is divided by the total number of soft magnetic particles 40 thus counted. A value obtained by the division is taken as length L12.

[Second Average Aspect Ratio]

In the second cross section of second member 20 shown in FIG. 5, the second average aspect ratio of soft magnetic particles 40 is greater than or equal to 1.2. The second cross section is a cross section orthogonal to the Z-axial direction. The second average aspect ratio is a ratio L22/L21 between an average length L21 and an average length L22 in the second cross section. Average length L21 is an average of lengths of soft magnetic particles 40 in the X-axial direction. Average length L22 is an average of lengths of soft magnetic particles 40 in the circumferential direction of stator core 7. As the second average aspect ratio is larger, the length of soft magnetic particles 40 in the circumferential direction of stator core 7 is longer than the length in the X-axial direction in the second cross section of second member 20.

In the second cross section of second member 20, a second field of view having a square shape is taken. The second field of view is taken so as to have a pair of first sides along the X-axial direction and a pair of second pieces along the Y-axial direction. When the second average aspect ratio of soft magnetic particles 40 is greater than or equal to 1.2, the number of soft magnetic particles 40 arranged in parallel in the circumferential direction of stator core 7 is smaller than the number of soft magnetic particles 40 arranged in parallel in the X-axial direction in the second field of view. That is, in the second field of view, the number of grain boundaries dividing the circumferential direction of stator core 7 is small. A preferable numerical range of the second average aspect ratio is the same as a preferable numerical range of the first average aspect ratio described above.

Average length L21 and average length L22 are obtained as follows. In the second cross section, a first imaginary line is drawn in the X-axial direction. A length of the first imaginary line may be, for example, 1000 μm. The number of soft magnetic particles 40 present on the first imaginary line is counted. The length of the first imaginary line is divided by the total number of soft magnetic particles 40 thus counted. A value obtained by the division is taken as length L21. Likewise, in the second cross section, a second imaginary line is drawn in the circumferential direction of stator core 7. The second imaginary line is an arc line protruding in the X2 direction. The second imaginary line of the present embodiment is an arc line concentric with the outer peripheral edge of second member 20. A length of the second imaginary line may be, for example, 1000 µm. The number of soft magnetic particles 40 present on the second imaginary line is counted. The length of the second imaginary line is divided by the total number of soft magnetic particles 40 thus counted. The value obtained by the division is taken as length L22.

[Third Average Aspect Ratio]

In the third cross section of third member 30 shown in FIG. 6, a third average aspect ratio of soft magnetic particles is greater than or equal to 1.2. The third cross section is a cross section orthogonal to the Z-axial direction. The third average aspect ratio is a ratio L32/L31 between an average length L31 and an average length L32 in the third cross section. Average length L31 is an average of lengths of soft magnetic particles 40 in the X-axial direction. Average length L32 is an average of lengths of soft magnetic particles 40 in the circumferential direction of stator core 7. As the third average aspect ratio is larger, the length of soft magnetic particles 40 in the circumferential direction of stator core 7 is longer than the length in the X-axial direction in the third cross section of third member 30.

In the third cross section of third member 30, a third field of view having a square shape similar to the second field of view described above is taken. When the third average aspect ratio of soft magnetic particles 40 is greater than or equal to 1.2, the number of soft magnetic particles 40 arranged in parallel in the circumferential direction of stator core 7 is smaller than the number of soft magnetic particles 40 arranged in parallel in the X-axial direction in the third field of view. That is, in the third field of view, the number of grain boundaries dividing the circumferential direction of stator core 7 is small. A preferable numerical range of the third average aspect ratio is the same as the preferable numerical range of the first average aspect ratio described above. How to obtain average length L31 and average length L32 is the same as how to obtain average length L21 and average length L22.

[Average Particle Size]

It is preferred that an average particle size of soft magnetic particles 40 is, for example, greater than or equal to 30 µm. When the average particle size of soft magnetic particles 40 is greater than or equal to 30 µm, a relative permeability tends to increase. Core piece 1 including soft magnetic particles 40 is low in loss. This allows core piece 1 to easily construct low-loss axial gap type rotary electric machine 9. The average particle size of soft magnetic particles 40 may be greater than or equal to 40 µm, or particularly may be greater than or equal to 50 µm. The upper limit of the average particle size of soft magnetic particles 40 may be, for example, 500 µm. When the average particle size of soft magnetic particles 40 is less than or equal to 500 µm, the eddy current loss in soft magnetic particles 40 tends to be small. Core piece 1 including soft magnetic particles 40 can easily construct axial gap type rotary electric machine 9 excellent in magnetic characteristics. That is, the average particle size of soft magnetic particles 40 may be greater than or equal to 30 µm and less than or equal to 500 µm, further may be greater than or equal to 40 µm and less than or equal to 450 µm, or particularly may be greater than or equal to 50 µm and less than or equal to 400 µm.

The average particle size of soft magnetic particles 40 is obtained as follows. The cross section of core piece 1 is observed with a scanning electron microscope (SEM). The cross section is prepared by a cross section polisher device. This cross section is taken as a cross section taken along both the X-axial direction and the Z-axial direction. An observation image of the cross section is taken. The magnification of the SEM is greater than or equal to 150 times and less than or equal to 500 times. The size of the observation image may be 800 µm*800 µm. The number of observation images to be taken is greater than or equal to 50. One observation image may be taken for each cross section, or a plurality of observation images may be taken for each cross section. In order to extract edges of the soft magnetic particles, each of the observation images thus taken is subjected to image processing. Examples of the image processing include thresholding. An area of each of all the soft magnetic particles present in each observation image is obtained. A diameter of a circle the same in area as each area is obtained. An average value of all the diameters thus obtained is obtained. This average value is taken as the average particle size of soft magnetic particles 40. The number of measurements for obtaining the average particle size may be, for example, greater than or equal to 200.

[Magnetic Path]

When axial gap type rotary electric machine 9 as shown in FIG. 18 is constructed using core piece 1, the magnetic flux passes through core piece 1. The magnetic flux sequentially passes through second member 20, first member 10, and third member 30 in this order as indicated by white arrows in FIG. 10, for example. Alternatively, the magnetic flux sequentially passes through third member 30, first member 10, and second member 20 in this order, although no white arrow is shown. The magnetic flux passing through second member 20 travels in the direction along the surface of second member 20. That is, the magnetic flux passing through second member 20 travels in the circumferential direction of stator core 7. The magnetic flux passing through first member 10 travels in the Z-axial direction. The magnetic flux passing through third member 30 travels in the direction along the surface of third member 30. That is, the magnetic flux passing through third member 30 travels in the circumferential direction of stator core 7. The magnetic flux passing through second member 20 and the magnetic flux passing through third member 30 travel in parallel to each other. The magnetic flux passing through second member 20 and the magnetic flux passing through first member 10 travel in different directions.

Since the first average aspect ratio of soft magnetic particles 40 is greater than or equal to 1.2 in the first cross section of first member 10 as described above, the length of soft magnetic particles 40 in the direction of the magnetic flux is longer than the length in the direction orthogonal to the magnetic flux in the first cross section. That is, in the first field of view of the first cross section, the number of soft magnetic particles 40 arranged in parallel in the direction of the magnetic flux is smaller than the number of soft magnetic particles 40 arranged in parallel in the direction orthogonal to the direction of the magnetic flux. In the first field of view, the number of grain boundaries dividing the direction of the magnetic flux is small.

Since the second average aspect ratio of soft magnetic particles 40 is greater than or equal to 1.2 in the second cross section of second member 20 as described above, the length of soft magnetic particles 40 in the direction of the magnetic flux is longer than the length in the direction orthogonal to the magnetic flux in the second cross section. That is, in the second field of view of the second cross section, the number of soft magnetic particles 40 arranged in parallel in the direction of the magnetic flux is smaller than the number of soft magnetic particles 40 arranged in parallel in the direction orthogonal to the direction of the magnetic flux. In the second field of view, the number of grain boundaries dividing the direction of the magnetic flux is small.

Since the third average aspect ratio of soft magnetic particles 40 is greater than or equal to 1.2 in the third cross section of third member 30 as described above, the length of soft magnetic particles 40 in the direction of the magnetic flux is longer than the length in the direction orthogonal to the magnetic flux in the third cross section. That is, in the third field of view of the third cross section, the number of soft magnetic particles 40 arranged in parallel in the direction of the magnetic flux is smaller than the number of soft magnetic particles 40 arranged in parallel in the direction orthogonal to the direction of the magnetic flux. In the third field of view, the number of grain boundaries dividing the direction of the magnetic flux is small.

As will be described later, such a core piece 1 can be produced by setting the pressing direction and the removing direction along the X-axial direction of core piece 1 when the raw material powder filled in the mold hole of the die of the mold is pressure molded by means of the upper punch and the lower punch.

Here, a case where the pressing direction and the removing direction are a direction along the axial direction of the stator core in the core piece, which are different from the pressing direction and the removing direction when core piece 1 of the present embodiment is produced, will be considered. In this case, core piece 1 including first member 10, second member 20, and third member 30 as in the present embodiment cannot be produced. This is because second member 20 and third member 30 have protruding portions 21, 31, respectively, protruding portions 21, 31 are caught by the inner peripheral surface of the mold hole of the die, and the core piece 1 cannot come out of the mold. As long as the core piece includes the first member and the second member without including the third member, the core piece can be produced even with the pressing direction and the removing direction set to a direction along the axial direction of the stator core in the core piece. The core piece that includes the first member and the second member without including the third member and is produced with the pressing direction and the removing direction set to a direction along the axial direction of the stator core in the core piece is a conventional core piece.

The first member of the conventional core piece has a first cross section similar to the first cross section of the first member of core piece 1 of the present embodiment. Further, the second member of the conventional core piece has a second cross section similar to the second cross section of the second member of core piece 1 of the present embodiment.

Unlike the first cross section of first member 10 of core piece 1 of the present embodiment, in the first cross section of the first member of the conventional core piece, the length of soft magnetic particles in the axial direction of the stator core is shorter than the length in the radial direction of the stator core. In the first cross section of the conventional core piece, a first field of view having a square shape similar to the first field of view described above is taken. Unlike the first field of view of core piece 1 of the present embodiment, in the first field of view of the conventional core piece, the number of soft magnetic particles arranged in parallel in the axial direction of the stator core is larger than the number of soft magnetic particles arranged in parallel in the radial direction of the stator core. That is, unlike the first field of view of the core piece 1 of the present embodiment, in the first field of view of the conventional core piece, the number of grain boundaries dividing the axial direction of the stator core is large. As with second member 20 of core piece 1 of the present embodiment, the magnetic flux passing through the first member of the conventional core piece travels in the axial direction of the stator core. That is, unlike the first field of view of core piece 1 of the present embodiment, in the first field of view of the conventional core piece, the number of soft magnetic particles arranged in parallel in the direction of the magnetic flux is larger than the number of soft magnetic particles arranged in parallel in the direction orthogonal to the direction of the magnetic flux. Unlike the first field of view of core piece 1 of the present embodiment, in the first field of view of the conventional core piece, the number of grain boundaries dividing the direction of the magnetic flux is large.

Unlike the second cross section of second member 20 of core piece 1 of the present embodiment, in the second cross section of the second member of the conventional core piece, the length of soft magnetic particles in the circumferential direction of the stator core is approximately the same as the length of soft magnetic particles in the radial direction of the stator core. In the second cross section of the conventional core piece, a second field of view having a square shape similar to the second field of view described above is taken. Unlike the second field of view of core piece 1 of the present embodiment, in the second field of view of the conventional core piece, the number of soft magnetic particles arranged in parallel in the circumferential direction of the stator core is approximately the same as the number of soft magnetic particles arranged in parallel in the radial direction of the stator core. That is, unlike the second field of view of core piece 1 of the present embodiment, in the second field of view of the conventional core piece, the number of grain boundaries dividing the circumferential direction of the stator core is approximately the same as the number of grain boundaries dividing the radial direction of the stator core. As with second member 20 of core piece 1 of the present embodiment, the magnetic flux passing through the second member of the conventional core piece travels in the circumferential direction of the stator core. That is, unlike the second field of view of core piece 1 of the present embodiment, in the second field of view of the conventional core piece, the number of soft magnetic particles arranged in parallel in the direction of the magnetic flux is approximately the same as the number of soft magnetic particles arranged in parallel in the direction orthogonal to the direction of the magnetic flux. Unlike the second field of view of core piece 1 of the present embodiment, in the second field of view of the conventional core piece, the number of grain boundaries dividing the direction of the magnetic flux is approximately the same as the number of grain boundaries dividing the direction orthogonal to the direction of the magnetic flux.

First member 10 of core piece 1 of the present embodiment is smaller in number of grain boundaries dividing the direction of the magnetic flux than the first member of the conventional core piece. This grain boundary becomes a magnetic gap. The larger the magnetic gap, the greater the magnetoresistance. This allows first member 10 of core piece 1 of the present embodiment to easily transmit the magnetic flux as compared with the first member of the conventional core piece. Second member 20 of core piece 1 of the present embodiment is approximately the same in ease of transmitting the magnetic flux as the second member of the conventional core piece. This allows core piece 1 of the present embodiment to easily transmit the magnetic flux as compared with the conventional core piece. Therefore, core piece 1 of the present embodiment can easily construct axial gap type rotary electric machine 9 excellent in magnetic characteristics as compared with the conventional core piece. As the number of core pieces constituting the stator core included in axial gap type rotary electric machine 9 is larger, core piece 1 of the present embodiment can easily construct axial gap type rotary electric machine 9 excellent in magnetic characteristics as compared with the conventional core pieces. As described above, when the proportion of second height H10 to first height H1 is greater than or equal to 80%, the proportion of the region excluding second member 20 from core piece 1, that is, the proportion of first member 10 and third member 30 in the present example tends to increase. Therefore, when second height H10 of the region excluding second member 20 from core piece 1 of the present embodiment and the height of the region excluding the second member from the conventional core piece are uniform, core piece 1 of the present embodiment can easily construct axial gap type rotary electric machine 9 excellent magnetic characteristics as compared with the conventional core piece.

[Relative Density]

The relative density of the green compact is preferably greater than or equal to 85%. The green compact having a relative density of greater than or equal to 85% is excellent in magnetic characteristics such as saturation magnetic flux density and in mechanical characteristics such as strength. The relative density of the green compact is further preferably greater than or equal to 90%, and especially preferably greater than or equal to 93%. The relative density of the green compact may be less than 100%. "Relative density" refers to the percentage (%) of the green compact relative to the true density of the soft magnetic particles constituting the green compact.

[Difference in Relative Density]

Among a first site, a second site, and a third site in core piece 1, difference in relative density between the first site and the second site, and the third site is preferably less than or equal to 5.0%. Since core piece 1 has small difference in relative density, physical characteristics such as magnetic characteristics inside core piece 1 are substantially uniform. It is preferred that the difference in relative density between the first site and the second site, and the third site is as small as possible. The difference in relative density between the first site and the second site, and the third site is further preferably less than or equal to 4.0%, and especially preferably less than or equal to 3.0%. Here, as shown in FIG. 2, among the sites obtained by dividing core piece 1 into three parts with an imaginary plane Va along the second parallel face of first lateral surface and with an imaginary plane Vb along the second parallel face of the second lateral surface, the site of the first direction side of the circumferential direction is defined as the first site, the site of the second direction side of the circumferential direction is defined as the second site, and the site between the first site and the second site is defined as the third site.

It is preferred that the difference in relative density between the member having the largest relative density and the member having the smallest relative density among first member 10, second member 20, and third member 30 is less than or equal to 5.0%. Since the difference in relative density is small in core piece 1, physical characteristics such as magnetic characteristics inside core piece 1 are substantially uniform. It is preferred that the difference in relative density between the member having the largest relative density and the member having the smallest relative density is as small as possible. The difference in relative density between the member having the largest relative density and the member having the smallest relative density is more preferably less than or equal to 4.0%, and especially preferably less than or equal to 3.0%.

It is preferred that the difference in relative density between the first site and the second site, and the third site is less than or equal to 5.0% and the difference in relative density between the member having the largest relative density and the member having the smallest relative density is less than or equal to 5.0%.

[Operation and Effect]

Since core piece 1 of the present embodiment allows the magnetic flux to easily pass through any of first member 10, second member 20, and third member 30, it is easy to construct axial gap type rotary electric machine 9 excellent in magnetic characteristics. Core piece 1 of the present embodiment is excellent in productivity since it is configured by a green compact in which first member 10, second member 20, and third member 30 are integrally molded.

[Method for Producing a Core Piece]

The method for producing a core piece according to the first embodiment includes a filling step and a molding step. In the filling step, mold 5 is filled with the raw material powder. The raw material powder contains a plurality of soft magnetic particles having a spherical shape. In the molding step, the raw material powder in mold 5 is compressed into a compact. The method for producing a core piece according to the present embodiment can produce core piece 1 according to the present embodiment. With reference to FIG. 11 to FIG. 14, mold 5 will be first described, and then each step will be described.

[Mold]

Mold 5 includes die 50, an upper punch 54 and lower punch 55. Die 50 and lower punch 55 forms a cavity. The cavity is filled with the raw material powder.

(Die)

Die 50 has a mold hole 50h. Mold hole 50h is arranged such that upper punch 54 and lower punch 55 face with each other. The inner peripheral shape of mold hole 50h corresponds to the shape of core piece 1. Upper punch 54 can be driven independently in the vertical direction relative to die 50. Lower punch 55 can be driven independently in the vertical direction relative to die 50.

Figure 11:
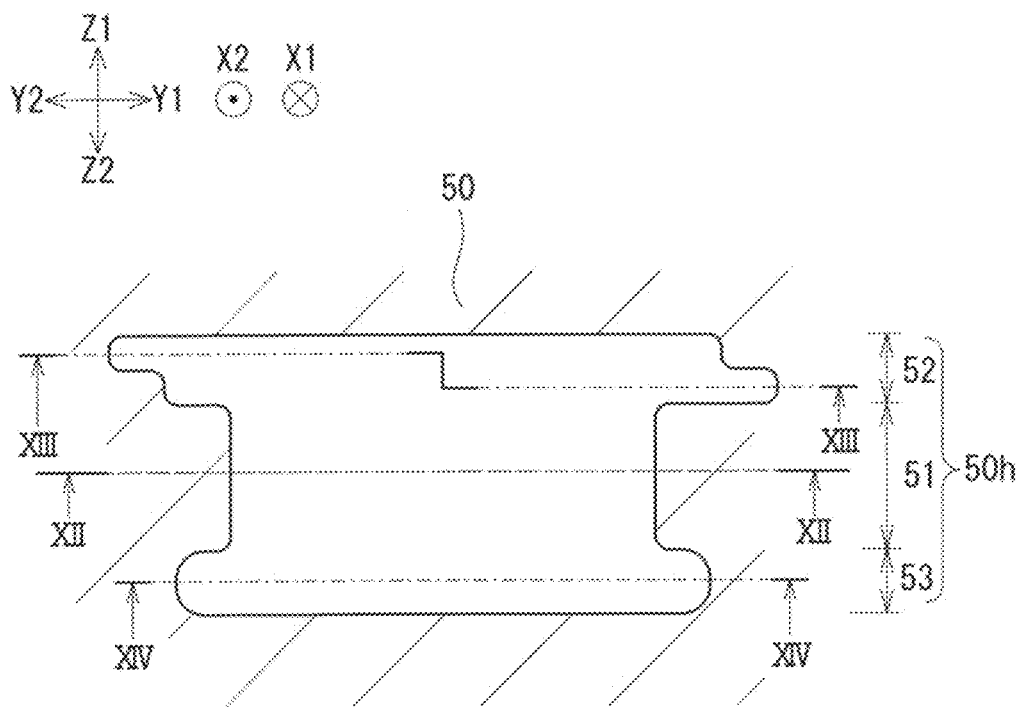
FIG. 11 is a top view showing an opening edge of a die of a mold for producing the core piece according to the first embodiment.
Figure 12:
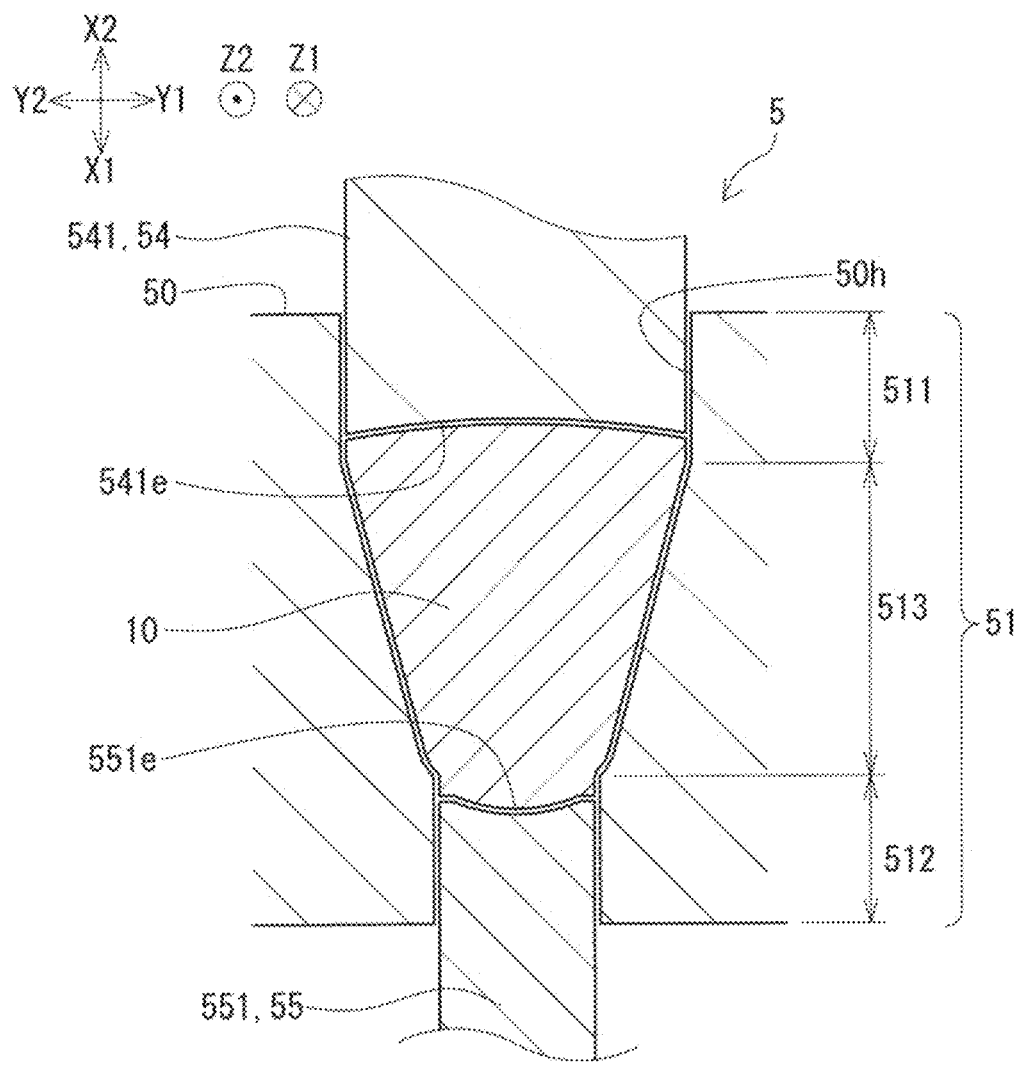
FIG. 12 is a sectional view showing an outline of a mold for producing a first member in the core piece according to the first embodiment.
Figure 13:
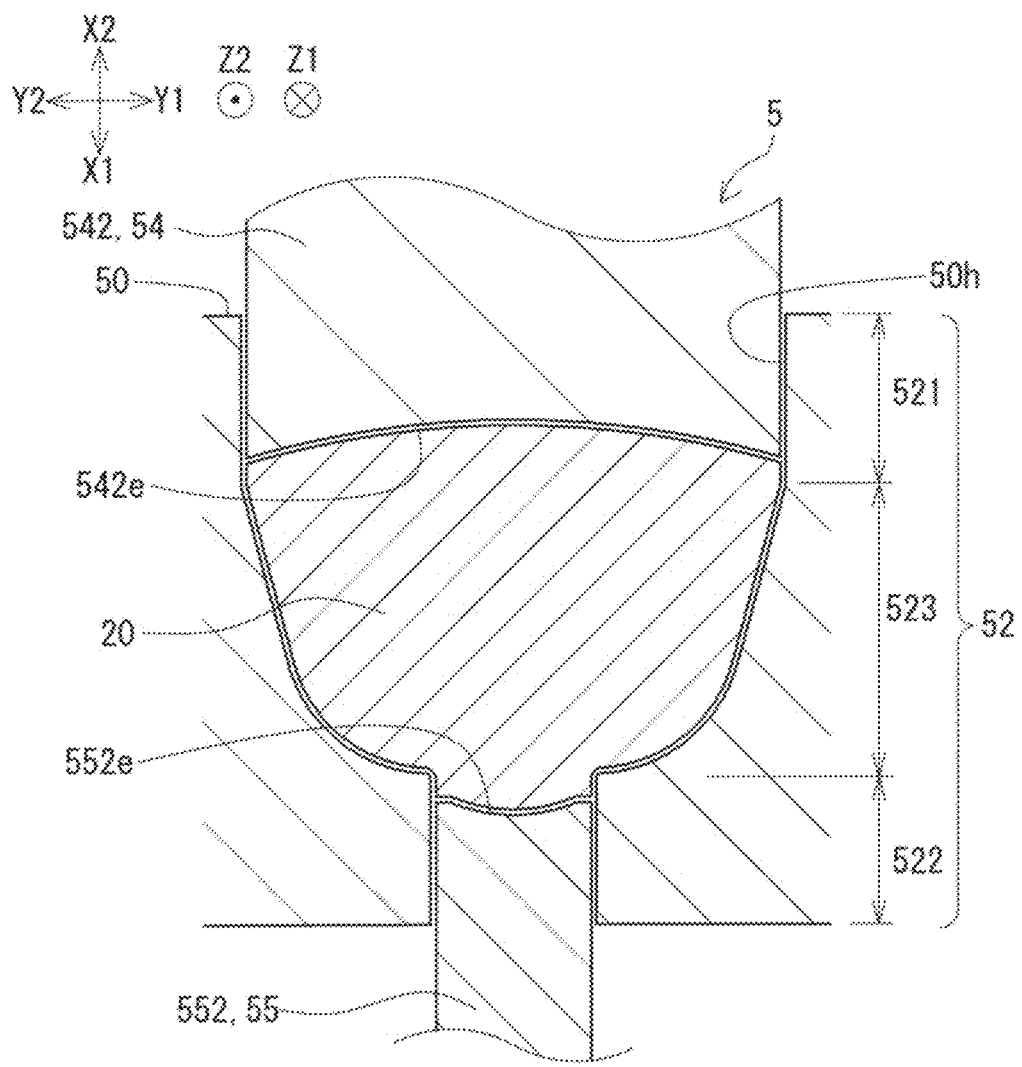
FIG. 13 is a sectional view showing an outline of a mold for producing a second member in the core piece according to the first embodiment.
Figure 14:
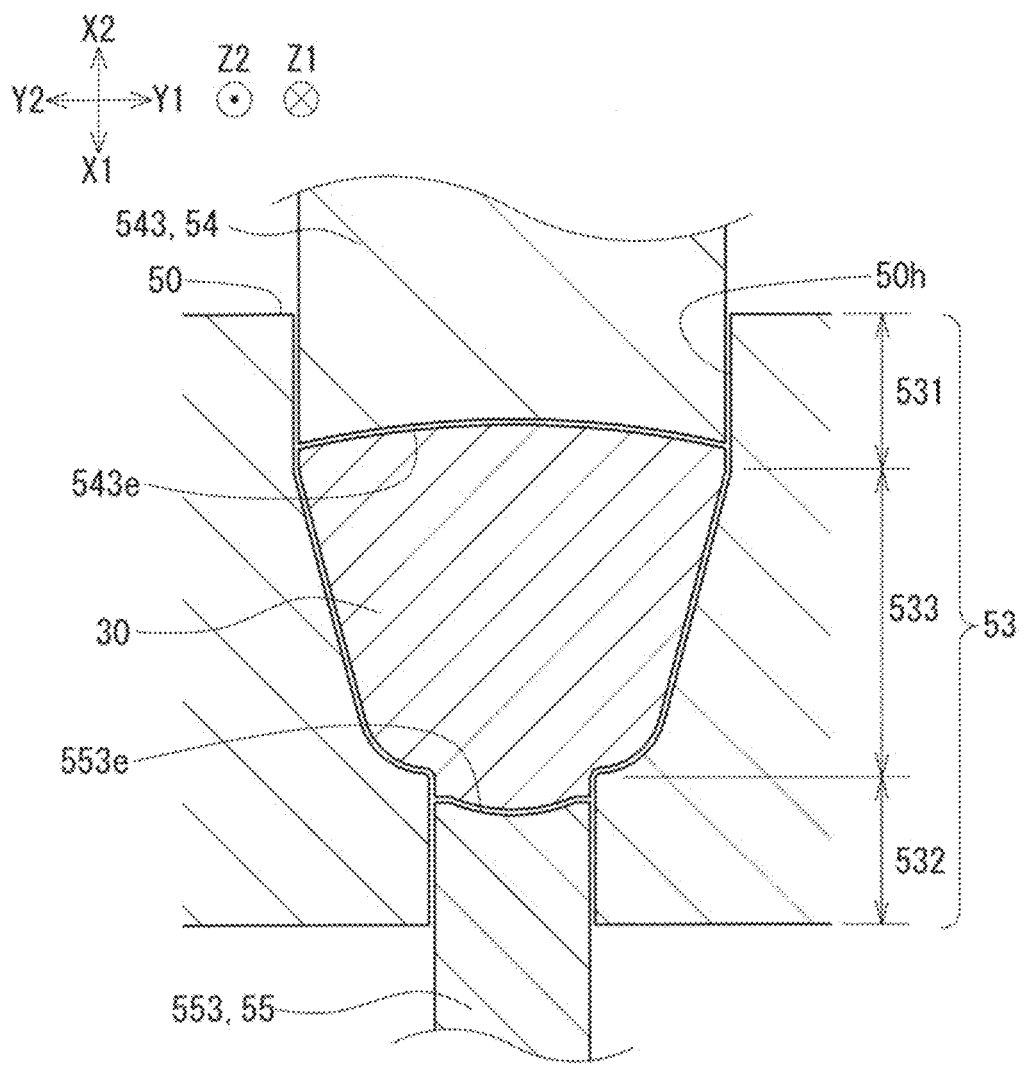
FIG. 14 is a sectional view showing an outline of a mold for producing a third member in the core piece according to the first embodiment.

Mold hole 50h has a first hole portion 51 shown in FIGS. 11 and 12, a second hole portion 52 shown in FIGS. 11 and 13, and a third hole portion 53 shown in FIGS. 11 and 14. FIG. 11 shows an opening edge on the side of upper punch 54 in mold hole 50h of die 50. In FIG. 11, die 50 is hatched for convenience of description. FIG. 12 to FIG. 14 are sectional views showing the state that the raw material powder filled in the cavity are pressure molded by means of upper punch 54 and lower punch 55. The cutting position of the sectional view of FIG. 12 corresponds to the position indicated by the XII-XII cutting line of FIG. 11. The cutting position of the sectional view of FIG. 13 corresponds to the position indicated by the XIII-XIII cutting line of FIG. 11. The cutting position of the sectional view of FIG. 14 corresponds to the position indicated by the XIV-XIV cutting line of FIG. 11.

First hole portion 51 has an inner peripheral surface that forms first lateral surface 14a and second lateral surface 14b of first member 10. Second hole portion 52 has an inner peripheral surface that forms first lateral surface 24a, second lateral surface 24b, first end surface 26, and second end surface 27 of second member 20. Third hole portion 53 has an inner peripheral surface that forms first lateral surface 34a, second lateral surface 34b, first end surface 36, and second end surface 37 of third member 30. First hole portion 51, second hole portion 52, and third hole portion 53 are formed in a series in the direction orthogonal to the direction in which upper punch 54 and lower punch 55 face with each other. To be more specific, second hole portion 52 communicates on the first end side in the orthogonal direction of first hole portion 51. Also, third hole portion 53 communicates on the second end side in the orthogonal direction of first hole portion 51.

First hole portion 51 includes a first straight part 511, a second straight part 512, and a taper part 513. First straight part 511, taper part 513, and second straight part 512 are formed sequentially in a series from the side of upper punch 54 toward the side of lower punch 55. Similarly, second hole portion 52 includes a first straight part 521, a second straight part 522, and a taper part 523. First straight part 521, taper part 523, and second straight part 522 are formed sequentially in a series from the side of upper punch 54 toward the side of lower punch 55. Similarly, third hole portion 53 includes a first straight part 531, a second straight part 532, and a taper part 533. First straight part 531, taper part 533, and second straight part 532 are formed sequentially in a series from the side of upper punch 54 toward the side of lower punch 55. First straight part 511, 521, 531 forms a part on the side of outer peripheral surface of core piece 1. Second straight part 512, 522, 532 forms a part on the inner peripheral surface side of core piece 1. Taper part 513, 523, 533 forms a part between the outer peripheral surface side and the inner peripheral surface side of core piece 1.

(Upper Punch)

Upper punch 54 has a first upper punch part 541 shown in FIG. 12, a second upper punch part 542 shown in FIG. 13, and a third upper punch part 543 shown in FIG. 14. First upper punch part 541 has a first lower end face 541e. First lower end face 541e forms outer peripheral surface 12 of first member 10. Second upper punch part 542 has a second lower end face 542e. Second lower end face 542e forms outer peripheral surface 22 of second member 20. Third upper punch part 543 has a third lower end face 543e. Third lower end face 543e forms outer peripheral surface 32 of third member 30. First upper punch part 541, second upper punch part 542, and third upper punch part 543 may be formed in a series, or may be formed independently from each other such that they can ascend and descend independently. When first upper punch part 541, second upper punch part 542, and third upper punch part 543 are formed in a series, first lower end face 541e, second lower end face 542e, and third lower end face 543e are formed in a series. The shape of first lower end face 541e corresponds to the shape of outer peripheral surface 12 of first member 10. The shape of second lower end face 542e corresponds to the shape of outer peripheral surface 22 of second member 20. The shape of third lower end face 543e corresponds to the shape of outer peripheral surface 32 of third member 30.

(Lower Punch)

Lower punch 55 has a first lower punch part 551 shown in FIG. 12, a second lower punch part 552 shown in FIG. 13, and a third lower punch part 553 shown in FIG. 14. First lower punch part 551 has a first upper end face 551e. First upper end face 551e forms inner peripheral surface 13 of first member 10. Second lower punch part 552 has a second upper end face 552e. Second upper end face 552e forms inner peripheral surface 23 of second member 20. Third lower punch part 553 has a third upper end face 553e. Third upper end face 553e forms inner peripheral surface 33 of third member 30. First lower punch part 551, second lower punch part 552, and third lower punch part 553 may be formed in a series, or may be formed independently from each other such that they can ascend and descend independently. When first lower punch part 551, second lower punch part 552, and third lower punch part 553 are formed in a series, first upper end face 551e, second upper end face 552e, and third upper end face 553e are formed in a series. The shape of first upper end face 551e corresponds to the shape of inner peripheral surface 13 of first member 10. The shape of second upper end face 552e corresponds to the shape of inner peripheral surface 23 of second member 20. The shape of third upper end face 553e corresponds to the shape of inner peripheral surface 33 of third member 30.

[Filling Step]

The cavity formed by die 50 and lower punch 55 is filled with raw material powder. As the raw material powder, soft magnetic powder or coated soft magnetic powder as described above can be used. The shape of the soft magnetic particles may be a spherical shape. The raw material powder may contain a binder and a lubricant in addition to the soft magnetic powder or the coated soft magnetic powder. A lubricant may be applied on the inner peripheral surface of mold hole 50h of die 50.

[Molding Step]

The raw material powder in the cavity is compression molded by means of upper punch 54 and lower punch 55. The direction of compressing the raw material powder is the direction along the radial direction of stator core 7. The higher the pressure of compression molding, the higher the relative density of produced core piece 1. The pressure may be, for example, greater than or equal to 700 MPa, and further may be greater than or equal to 980 MPa.

[Other Steps]

After the molding step, a heat treatment may be conducted as necessary. For example, by removing strains by a heat treatment, it is possible to produce core piece 1 of low loss. For example, by a heat treatment, a binder or a lubricant may be removed. When the raw material powder contains coated soft magnetic particles 4 described above, it is preferred that the heat treatment temperature is less than or equal to the decomposition temperature of the insulating coating.

[Operation and Effect]

The method for producing a core piece of the present embodiment can produce core piece 1 of the present embodiment described above. That is, the method for producing a core piece of the present embodiment can produce core piece 1 that can easily construct axial gap type rotary electric machine 9 excellent in magnetic characteristics. Further, since first member 10, second member 20, and third member 30 can be integrally molded by means of the method for producing a core piece of the present embodiment, it is easy to increase the productivity of the core piece.

Second Embodiment

[Core Piece]

Figure 15:
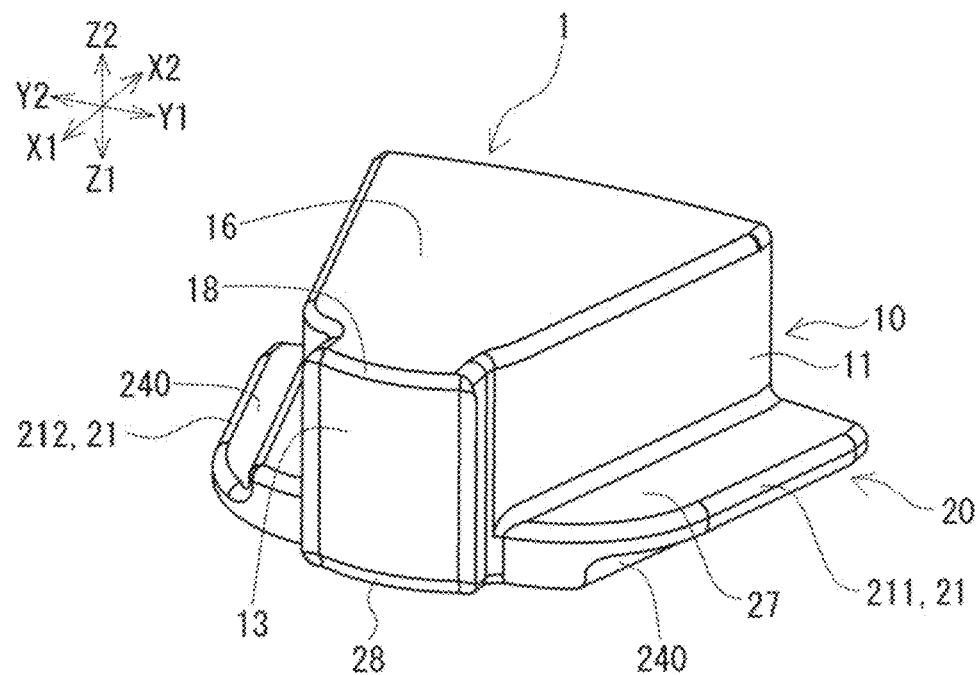
FIG. 15 is a perspective view showing an outline of a core piece according to a second embodiment.

With reference to FIG. 15, core piece 1 according to a second embodiment will be described. Core piece 1 of the present embodiment is different from core piece 1 according to the first embodiment mainly in that core piece 1 does not include the third member.

When the third member is not provided as in the present embodiment, the first height of core piece 1 is a length between first end surface 26 and an end surface 16 of first member 10. The second height is a height of first member 10, that is, a length between second end surface 27 and end surface 16 of first member 10.

It is preferred that a corner part between the outer peripheral surface and end surface 16 of first member 10 and a corner part 18 between the inner peripheral surface and end surface 16 of first member 10 are chamfered. The chamfering may be C chamfering or R chamfering as with corner part 28 described above. A preferable numerical range of the chamfering length of corner part 18 is the same as a preferable numerical range of the chamfering length of corner part 28.

In first member 10 of the present embodiment, as with first member 10 of core piece 1 of the first embodiment, the first average aspect ratio of soft magnetic particles 40 is greater than or equal to 1.2 in the first cross section. A preferable numerical range of the first average aspect ratio is as in the first embodiment.

In second member 20 of the present embodiment, as with second member 20 of core piece 1 of the first embodiment, the second average aspect ratio of soft magnetic particles 40 is greater than or equal to 1.2 in the second cross section. A preferable numerical range of the second average aspect ratio is as in the first embodiment.

[Operation and Effect]

As with core piece 1 of the first embodiment, core piece 1 of the present embodiment can easily construct axial gap type rotary electric machine 9 excellent magnetic characteristics.

Third Embodiment

[Stator Core]

With reference to FIG. 16, stator core 7 according to a third embodiment will be described. Stator core 7 of the present embodiment has plural core pieces 1 that are circularly arranged. Each of plural core pieces 1 of the present embodiment is core piece 1 according to the first embodiment. Unlike the present embodiment, each of plural core pieces 1 may be core piece 1 according to the second embodiment. Plural core pieces 1 according to the present embodiment are circularly combined such that, regarding core pieces 1 adjoining in the circumferential direction, step 240 of first lateral surface 24a in second member 20 of first core piece 1 and step 240 of second lateral surface 24b in second member 20 of second core piece 1 fit with each other. Stator core 7 is used in axial gap type rotary electric machine 9 of DS/SR configuration shown in FIG. 18.

It is preferred that variation in length between the surface on the first end side and the surface on the second end side in the Z-axial direction in each of plural core pieces 1 is less than or equal to 0.1 mm. The length between the surface on the first end side and the surface on the second end side in the Z-axial direction means the maximum length of lengths between first end surface 26 of second member 20 and first end surface 36 of third member 30.

If the variation in length between first end surface 26 of second member 20 and first end surface 36 of third member 30 in each of plural core pieces 1 is less than or equal to 0.1 mm, the variation in length is very small. Therefore, stator core 7 can construct axial gap type rotary electric machine 9 generating little noises and vibrations. The reason is as follows. Axial gap type rotary electric machine 9 is arranged such that stator 8 and rotor 90 face with each other as shown in FIG. 18. Since the variation in length in stator core 7 is small, the variation in the interval between stator 8 and rotor 90 is small. Since the variation in the interval is small, the torque ripple is small. Since the torque ripple is small, noises and vibrations are difficult to increase. The variation in length is determined in the following manner. In each core piece 1, the length from first end surface 26 of second member 20 to first end surface 36 of third member 30 is measured. This length is the maximum length along the Z-axial direction of core piece 1. Difference between the maximum value and the minimum value of the length in each of plural core pieces 1 is calculated. The difference is defined as the aforementioned variation in length. The variation in length between first end surface 26 of second member 20 and first end surface 36 of third member 30 in each of plural core pieces 1 is further preferably less than or equal to 0.05 mm, and especially preferably less than or equal to 0.01 mm.

[Operation and Effect]

Since the plural core pieces constituting stator core 7 are each configured by core piece 1 of the first embodiment that easily transmits the magnetic flux, stator core 7 of the present embodiment can easily construct axial gap type rotary electric machine 9 excellent in magnetic characteristics. Stator core 7 of the present embodiment is excellent in productivity since plural core pieces 1 constituting stator core 7 are configured by core piece 1 of the first embodiment that is excellent in productivity.

Fourth Embodiment

[Stator]

With reference to FIG. 17, stator 8 according to a fourth embodiment will be described. Stator 8 of the present embodiment includes stator core 7 and coil 80. As stator core 7, stator core 7 according to the third embodiment can be used. Coil 80 is wound around first member 10 in each core piece 1 of stator core 7. Stator 8 is used in axial gap type rotary electric machine 9 of DS/SR configuration shown in FIG. 18.

Each coil 80 includes a cylindrical part formed by winding wire. As the winding wire, coated round wire is used. Coated round wire includes a conductor of round wire, and an edge coating provided on the outer periphery of the conductor. In FIG. 17, only the cylindrical part of each coil 80 is shown in a simplified form, and illustration of both end parts of the winding wire is omitted. Stator core 7 can be manufactured by winding wire outside first member 10 of each core piece 1.

[Operation and Effect]

Since stator 8 of the present embodiment includes stator core 7 of the third embodiment, it is easy to construct axial gap type rotary electric machine 9 excellent in magnetic characteristics. Stator 8 of the present embodiment is excellent in productivity since stator 8 includes stator core 7 of the third embodiment that is excellent in productivity.

Fifth Embodiment

[Rotary Electric Machine]

With reference to FIG. 18, rotary electric machine 9 according to a fifth embodiment will be described. FIG. 18 is a sectional view cut on a plane that is parallel with a rotary shaft 91 of rotary electric machine 9, and passes the center of the circumferential direction of core piece 1. This point also applies to FIG. 19 referred to in a later-described sixth embodiment. Rotary electric machine 9 of the present embodiment is an axial gap type rotary electric machine. Rotary electric machine 9 of the present embodiment is of DS/SR configuration including one rotor 90 and two stators 8. In other words, in rotary electric machine 9, rotor 90 and stator 8 are arranged to face with each other in the axial direction. Rotor 90 and stator 8 are assembled such that one rotor 90 is sandwiched between two stators 8. As each stator 8, stator 8 according to the fourth embodiment described above may be used. Rotary electric machine 9 can be utilized in a motor or a generator. Rotary electric machine 9 includes a casing 92.

Casing 92 has a cylindrical interior space that accommodates stator 8 and rotor 90. Casing 92 includes a cylindrical part 921 and two plates 922. Cylindrical part 921 surrounds the outer peripheries of stator 8 and rotor 90. Plates 922 are respectively arranged on both ends of cylindrical part 921. Two plates 922 are fixed to both end surfaces of cylindrical part 921 in such a manner that plates 922 sandwich stator 8 and rotor 90 from both sides of the axial direction. Both plates 922 have a through hole in the center part. The through hole is provided with a bearing 93. Rotary shaft 91 penetrates the through hole with the bearing 93 interposed therebetween. Rotary shaft 91 penetrates inside of casing 92.

Rotor 90 includes magnet 95 and a rotor body. Rotor 90 is a flat plate-like member in the present embodiment. The number of magnet 95 may be plural as in the present embodiment, or only one magnet 95 may be provided unlike the present embodiment. When the number of magnet 95 is plural, plural magnets 95 are arranged at regular intervals in the circumferential direction of the rotor body. In the present embodiment, each magnet 95 is in the form of a flat plate having a surface shape corresponding the surface shape of first end surface 36 of third member 30 in each core piece 1. Each magnet 95 may be in the form of a convex lens having a convex surface toward the side of each stator S. When the number of magnet 95 is one, magnet 95 has a circular shape. In one magnet 95, the S pole and the N pole are alternately arranged in the circumferential direction. The rotor body supports plural magnets 95. The rotor body is a circular member. The rotor body is rotatably supported by rotary shaft 91. Magnets 95 are arranged at regular intervals in the circumferential direction of the rotor body. Magnets 95 are polarized in the axial direction of rotary shaft 91. Magnetization directions of magnets 95 adjoining in the circumferential direction of the rotor body are opposite to each other. Rotor 90 rotates by repetition of attraction and repulsion between magnet 95 and each core piece 1 by a rotating magnetic field generated in stator 8.

Stator 8 is arranged such that first end surface 36 of third member 30 in each core piece 1 faces with magnet 95 of rotor 90. As rotor 90 rotates, first end surface 36 of third member 30 in each core piece 1 receives a magnetic flux from rotating magnet 95. As shown in FIG. 3, when first end surface 36 of third member 30 in each core piece 1 is formed to have a convex shape as described above, noises and vibrations of rotary electric machine 9 can be reduced. The reason is as follows. Since first end surface 36 of third member 30 in each core piece 1 is formed to have a convex shape, abrupt change in the magnetic flux of magnet 95 of rotor 90 received by core piece 1 is easily suppressed. Therefore, cogging torque is easily reduced. Since the cogging torque is small, noises and vibrations are difficult to increase.

The proportion of the first magnetoresistance of core piece 1 to the magnetoresistance of rotary electric machine 9 may be, for example, greater than or equal to 2%. As described above, first member 10 of core piece 1 of the first embodiment is smaller in magnetoresistance than the first member of the conventional core piece. Therefore, as the proportion is higher, rotary electric machine 9 including core piece 1 is more excellent in magnetic characteristics than the rotary electric machine including the conventional core piece. The first magnetoresistance is the magnetoresistance of the region excluding second member 20 from core piece 1. That is, the first magnetoresistance of core piece 1 of the first embodiment 1 is the sum of the magnetoresistance of first member 10 and the magnetoresistance of third member 30. The first magnetoresistance of core piece 1 of second embodiment is the magnetoresistance of first member 10. When the proportion is greater than or equal to 2% A, rotary electric machine 9 including core piece 1 is more excellent in magnetic characteristics than the rotary electric machine including the conventional core piece. The proportion further may be greater than or equal to 2.5% or particularly may be greater than or equal to 3%. The upper limit of the proportion may be, for example, practically 30%. That is, the proportion may be greater than or equal to 2% and less than or equal to 30%, further may be greater than or equal to 2.5% and less than or equal to 28%, or particularly may be greater than or equal to 3% and less than or equal to 25%.

The magnetoresistance of rotary electric machine 9 is the sum of second magnetoresistance, third magnetoresistance, and fourth magnetoresistance. The second magnetoresistance is the sum of magnetoresistance of magnet 95 of rotor 90. The third magnetoresistance is the sum of magnetoresistance of an air gap. The fourth magnetoresistance is the sum of magnetoresistance of core piece 1. When a back yoke 98 is provided as in rotary electric machine 9 of the sixth embodiment to be described later, the magnetoresistance of rotary electric machine 9 is the sum of the second magnetoresistance, the third magnetoresistance, the fourth magnetoresistance, and the magnetoresistance of back yoke 98. Here, each magnetoresistance is regarded as follows.

The magnetoresistance of magnet 95 is the product of the area of magnet 95 and the thickness of magnet 95. The area of magnet 95 is an area of the surface of magnet 95 facing core piece 1.

The magnetoresistance of each air gap is the product of the area of magnet 95 and the length of the gap. The length of the gap is a length, in the axial direction, of stator core 7 between magnet 95 and core piece 1.

The magnetoresistance of each core piece 1 is the sum of the magnetoresistance of first member 10, the magnetoresistance of second member 20, and the magnetoresistance of third member 30. When third member 30 is not provided, the magnetoresistance of each core piece 1 is the sum of the magnetoresistance of first member 10 and the magnetoresistance of second member 20.

The magnetoresistance of first member 10 is the product of the area of first member 10 and the height of first member 10. The area of first member 10 is the area of the cross section of first member 10 orthogonal to the axial direction of stator core 7.

The magnetoresistance of second member 20 is the product of the area of second member 20 and the magnetic path length of second member 20. The area of second member 20 is the area of the cross section of second member 20 orthogonal to the axial direction of stator core 7. The magnetic path length of second member 20 is an arc length between the centers of gravity of first members 10 adjacent to each other in the circumferential direction when stator core 7 is viewed from above.

The magnetoresistance of third member 30 is the product of the area of third member 30 and the magnetic path length of third member 30. The area of third member 30 is the area of the cross section of third member 30 orthogonal to the axial direction of stator core 7. The magnetic path length of third member 30 is an arc length between the centers of gravity of first members 10 adjacent to each other in the circumferential direction when stator core 7 is viewed from above.

The magnetoresistance of back yoke 98 is the product of the area of back yoke 98 and the magnetic path length of back yoke 98. The area of back yoke 98 is the area of the cross section of back yoke 98 orthogonal to the axial direction of rotary electric machine 9. The magnetic path length of back yoke 98 is an arc length between the centers of gravity of magnets 95 adjacent to each other in the circumferential direction when rotor 90 is viewed from above.

[Operation and Effect]

Rotary electric machine 9 of the present embodiment is excellent in magnetic characteristics since rotary electric machine 9 includes stator 8 of the fourth embodiment. Rotary electric machine 9 of the present embodiment is excellent in productivity since rotary electric machine 9 includes stator 8 of the fourth embodiment that is excellent in productivity.

<Sixth Embodiment>

[Rotary Electric Machine]

With reference to FIG. 19, rotary electric machine 9 according to the sixth embodiment will be described. Rotary electric machine 9 of the present embodiment is an axial gap type rotary electric machine. Rotary electric machine 9 of the present embodiment is different from rotary electric machine 9 of the fifth embodiment mainly in that the rotary electric machine is of SS/DR configuration including two rotors 90 and one stator 8. In other words, in rotary electric machine 9, rotor 90 and stator 8 are arranged to face with each other in the axial direction. Rotor 90 and stator 8 are assembled such that one stator 8 is sandwiched between two rotors 90. The following description focuses on a point of difference from the fifth embodiment. Description of the same configuration as that in the fifth embodiment is omitted.

Each rotor 90 includes the rotor body, plural magnets 95, and a back yoke 98. The rotor body and plural magnets 95 are as described in the fifth embodiment. Back yoke 98 is disposed between rotor 90 and plate 922. Back yoke 98 is a flat plate member. Back yoke 98 is configured by the same green compact as that of core piece 1 described above, or a laminated steel plate.

Stator 8 includes plural core pieces 1 that are circularly arranged, coil 80 wound on first member 10 of each core piece 1, and a supporting member that retains plural core pieces 1. Illustration of the supporting member is omitted. Core pieces 1 are the same in configuration of second member 20 and third member 30. That is, core pieces 1 are the same in the protruding amount of first protruding part 211 and second protruding part 212 in second member 20, and in the protruding amount of first protruding part 311 and second protruding part 312 in third member 30. Also, first lateral surface 24a of first protruding part 211 and second lateral surface 24b of second protruding part 212 in second member 20 are not provided with a step as described above. Coil 80 is as described in the fourth embodiment. A holder retains plural core pieces 1 such that intervals between core pieces 1 are regular intervals. This holder prevents core pieces 1 adjoining in the circumferential direction from coming into contact with each other.

[Operation and Effect]

Rotary electric machine 9 of the present embodiment is excellent in magnetic characteristics as with rotary electric machine 9 of the fifth embodiment. Rotary electric machine 9 according to the sixth embodiment is excellent in productivity since rotary electric machine 9 includes stator 8 that is excellent in productivity as with rotary electric machine 9 of the fifth embodiment.

The scope of the present invention is indicated by the appended claims rather than by the foregoing illustration, and is intended to include all modifications within the equivalent meaning and scope of the claims. For example, the rotary electric machine may be the one that includes one rotor and one stator.

REFERENCE SIGNS LIST

1: core piece
10: first member
11: peripheral surface, 12: outer peripheral surface, 13: inner peripheral surface
14a: first lateral surface, 14b: second lateral surface
141: first parallel face, 142: second parallel face, 143: first inclined face
16: end surface, 18: corner part
20: second member
21: protruding portion, 211: first protruding part, 212: second protruding part
22: outer peripheral surface, 23: inner peripheral surface, 24a: first lateral surface, 24b: second lateral surface
240: step
241: first parallel face, 242: second parallel face, 243: first inclined face
244: projecting part
26: first end surface, 27: second end surface, 28: corner part
30: third member
31: protruding portion, 311: first protruding part, 312: second protruding part
32: outer peripheral surface, 33: inner peripheral surface
34a: first lateral surface, 34b: second lateral surface
341: first parallel face, 342: second parallel face, 343: first inclined face
36: first end surface, 37: second end surface, 38: corner part
4: coated soft magnetic particle, 40: soft magnetic particle, 41: insulating coating
5: mold
50: die, 50h: mold hole
51: first hole portion
511: first straight part, 512: second straight part, 513: taper part
52: second hole portion
521: first straight part, 522: second straight part, 523: taper part
53: third hole portion
531: first straight part, 532: second straight part, 533: taper part
54: upper punch
541: first upper punch part, 541e: first lower end face
542: second upper punch part, 542e: second lower end face
543: third upper punch part, 543e: third lower end face
55: lower punch
551: first lower punch part, 551e: first upper end face
552: second lower punch part, 552e: second upper end face
553: third lower punch part, 553e: third upper end face
7: stator core, 8: stator, 80: coil
9: rotary electric machine 90: rotor, 91: rotary shaft, 92: casing
921: cylindrical part, 922: plate
93: bearing, 95: magnet, 98: back yoke
E11, E12, E21, E22, E31, E32: extended plane
Va, Vb: imaginary plane, V21: first imaginary plane, V22: second imaginary plane
θ11, θ21, θ31: first inclination angle
θ12, θ22, θ32: second inclination angle
H1: first height, H10: second height

The invention claimed is:

1. A core piece that is circularly arranged to construct a stator core of an axial gap type rotary electric machine, the core piece comprising:
   a first member in a column form extending in an axial direction of the stator core; and
   a second member in a plate form disposed on a first end side of the first member in the axial direction of the stator core,
   wherein
   the first member and the second member are configured by a green compact in which the first member and the second member are integrally molded,
   the green compact includes a plurality of soft magnetic particles,
   the soft magnetic particles have a flat shape,
   a first average aspect ratio of the soft magnetic particles is greater than or equal to 1.2 in a first cross section of the first member in the axial direction and a radial direction of the stator core,
   a second average aspect ratio of the soft magnetic particles is greater than or equal to 1.2 in a second cross section of the second member orthogonal to the axial direction of the stator core,
   the first average aspect ratio is a ratio L12/L11 between an average length L11 and an average length L12 in the first cross section,
   the second average aspect ratio is a ratio L22/L21 between an average length L21 and an average length L22 in the second cross section,
   the average length L11 is an average of lengths of the soft magnetic particles in the radial direction of the stator core,
   the average length L12 is an average of lengths of the soft magnetic particles in the axial direction of the stator core,
   the average length L21 is an average of lengths of the soft magnetic particles in the radial direction of the stator core, and
   the average length L22 is an average of lengths of the soft magnetic particles in a circumferential direction of the stator core.

2. The core piece according to claim 1, wherein a relative density of the green compact is greater than or equal to 85%.

3. The core piece according to claim 1, wherein the soft magnetic particles are composed of pure iron or an iron-based alloy, and
   the iron-based alloy is an Fe-Si alloy, an Fe-Al alloy, or an Fe-Si-Al alloy.

4. The core piece according to claim 1, wherein an average particle size of the soft magnetic particles is greater than or equal to 30 μm.

5. The core piece according to claim 1, wherein a proportion of a second height to a first height of the core piece is greater than or equal to 80%,
   the first height is a length of the core piece in the axial direction of the stator core, and
   the second height is a length, in the axial direction of the stator core, of a region excluding the second member from the core piece.

6. The core piece according to claim 1, wherein the second member includes an outer peripheral surface located on an outer peripheral side of the stator core, an inner peripheral surface located on an inner peripheral side of the stator core, and a first end surface located on a first end side of the stator core in the axial direction,
   a corner part between the outer peripheral surface and the first end surface and a corner part between the inner peripheral surface and the first end surface are chamfered, and
   a chamfering length of each of the corner parts is greater than or equal to 0.1 mm and less than or equal to 0.5 mm.

7. The stator core of the axial gap type rotary electric machine, the stator core comprising a plurality of core pieces that are circularly arranged, each of the plurality of core pieces being the core piece according to claim 1.

8. A stator of the axial gap type rotary electric machine, the stator comprising:
   the stator core according to claim 7; and
   a coil arranged on each of the first members in the stator core.

9. The axial gap type rotary electric machine comprising:
   a rotor; and
   the stator,
   wherein the stator is the stator according to claim 8.

10. The rotary electric machine according to claim 9, wherein
    a proportion of first magnetoresistance of the core piece to magnetoresistance of the rotary electric machine is greater than or equal to 2%, and
    the first magnetoresistance is magnetoresistance of a region excluding the second member from the core piece.

* * * * *